US012791702B2

(12) United States Patent
Gacem et al.

(10) Patent No.: US 12,791,702 B2
(45) Date of Patent: Nov. 10, 2026

(54) DRONE-MOUNTED GROUND PENETRATING RADAR ANTENNA ALTITUDE AND TILT ADJUSTMENT SYSTEM

(71) Applicant: UNIVERSITY OF SHARJAH, Sharjah (AE)

(72) Inventors: Mohamed Ait Gacem, Sharjah (AE); Saleh Abu Dabous, Sharjah (AE)

(73) Assignee: UNIVERSITY OF SHARJAH, Sharjah (AE)

(*) Notice: Subject to any disclaimer, the term of this patent is extended or adjusted under 35 U.S.C. 154(b) by 0 days.

(21) Appl. No.: 19/432,278

(22) Filed: Dec. 24, 2025

(65) Prior Publication Data

US 2026/0186126 A1 Jul. 2, 2026

Related U.S. Application Data

(60) Provisional application No. 63/740,566, filed on Dec. 31, 2024.

(51) Int. Cl.
*G01S 13/88* (2006.01)
*G01V 3/12* (2006.01)

(52) U.S. Cl.
CPC .............. *G01S 13/885* (2013.01); *G01V 3/12* (2013.01)

(58) Field of Classification Search
CPC ................................ G01S 13/885; G01V 3/12
See application file for complete search history.

(56) References Cited

U.S. PATENT DOCUMENTS

| | | | | |
|---|---|---|---|---|
| 8,643,533 | B1 | 2/2014 | Woodell et al. | |
| 9,205,922 | B1 * | 12/2015 | Bouwer | B64C 37/02 |
| 10,895,637 | B1 * | 1/2021 | Padmanabhan | G01S 13/885 |
| 11,774,579 | B1 * | 10/2023 | Wang | G01S 13/865 324/329 |
| 2003/0112170 | A1 | 6/2003 | Doerksen et al. | |
| 2016/0350907 | A1 | 12/2016 | Simula et al. | |

(Continued)

FOREIGN PATENT DOCUMENTS

| | | | |
|---|---|---|---|
| BR | 102021006243 | A2 | 3/2022 |
| CN | 107356609 | A | 11/2017 |

OTHER PUBLICATIONS

Lijcklama À Nijeholt L, Kronshorst TY, Teeffelen KV, van Manen B, Emaus R, Knotter J, Mersha A. Utilizing Drone-Based Ground-Penetrating Radar for Crime Investigations in Localizing and Identifying Clandestine Graves. Sensors (Basel). Aug. 11, 2023 (Year: 2023).*

(Continued)

*Primary Examiner* — Marcus E Windrich
(74) *Attorney, Agent, or Firm* — MH2 Technology Law Group, LLP

(57) ABSTRACT

An integrated peripheral drone-mounted ground penetrating radar (GPR) antenna altitude and tilt adjustment system is provided. The system includes a pulleys and ropes lifting mechanism connected to servo motors. The system includes a detachment mechanism controlled by a servo motor. The system includes a data processing and control circuit. The system includes a GPS module. The system includes a wireless transmitter and receiver circuit. The system includes infrared sensors. The system includes depth cameras. The system includes a battery. The system includes a voltage regulator.

18 Claims, 15 Drawing Sheets

(56) References Cited

U.S. PATENT DOCUMENTS

| | | | | |
|---|---|---|---|---|
| 2017/0066530 | A1* | 3/2017 | Salzmann | B64C 27/04 |
| 2018/0072415 | A1* | 3/2018 | Cantrell | B64D 1/10 |
| 2019/0064362 | A1* | 2/2019 | Scott | G01S 13/865 |
| 2021/0309352 | A1* | 10/2021 | Elkins | B64U 10/13 |
| 2023/0054822 | A1* | 2/2023 | Beer | G01S 13/003 |
| 2023/0131412 | A1* | 4/2023 | Aljabri | G01S 13/885<br>166/250.01 |
| 2023/0291097 | A1* | 9/2023 | Knorr | H01Q 1/084 |

OTHER PUBLICATIONS

Chelmus et al., "Upgrading a GPR System to Conduct Lowaltitude Aerial Geophysical Investigations", U.P.B. Sci. Bull., 2022, Series C, vol. 84, Issue 3, 12 pages.

Nijeholt et al., "Utilizing Drone-Based Ground-Penetrating Radar for Crime Investigations in Localizing and Identifying Clandestine Graves", Sensors, 2023, vol. 23, 7119, 23 pages.

* cited by examiner

DRONE-MOUNTED GROUND PENETRATING RADAR ANTENNA ALTITUDE AND TILT ADJUSTMENT SYSTEM

FIELD OF INVENTION

The present disclosure relates to drone-mounted ground penetrating radar systems, and more particularly to an integrated peripheral system for real-time altitude and tilt adjustment of a ground penetrating radar antenna using servo motor-controlled pulleys and ropes with automated and remotely controlled operational modes.

BACKGROUND

Ground Penetrating Radar (GPR) non-destructive inspection is utilized in various civil engineering applications including underground utilities and pipelines evaluation, oil and gas industries, and pavement inspection. GPR scanners are mounted on inspection mediums such as GPR carts, drones, and inspection vehicles. Among these, drone-based GPR systems enable the inspection of areas that are inaccessible by traditional GPR inspection mediums.

The depth and accuracy of a GPR system is dependent on the antenna's characteristics and its distance from the inspected surface. Imaging performance is generally improved when the antenna-inspected surface separating distance is minimized, which helps maximize the energy transmitted and extracted through the surface to inner layers. However, in practice, the GPR antenna is lifted from the ground to avoid damage caused by friction and obstacles, which can result in deteriorated imaging quality due to lower signal strength of electromagnetic waves passing through the ground. Higher separation distances between the GPR antenna and inspected surfaces can result in higher signal to noise ratio and lower spatial resolution, which makes radargram interpretation more challenging.

A common approach to address antenna height limitations involves covering the antenna with a protective cover, then replacing it when worn out. However, the replacement of such casing can be time-consuming and costly. Additionally, different casing materials and thicknesses affect the antenna's characteristics and alter the depth of inspection. Drone-based GPR inspection systems are particularly affected by antenna height limitations, since a higher safety distance is used to avoid contact with the inspected surface, which might result in destabilizing the drone.

Another limitation facing existing GPR inspection mediums, including drone-based systems, is that they are primarily designed to inspect flat surfaces, thus restricting spatial manipulation of the antenna. This can prevent inserting the GPR antenna in tight spaces or in-between-cracks. Such limitations can restrict the evaluation of structures like rocky formations with cavities, damaged structures during disaster response scenarios, and complex archeological sites.

Accordingly, there is a general desire for improved systems and methods for drone-mounted GPR antenna positioning that address at least some of these considerations.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, an integrated peripheral drone-mounted ground penetrating radar (GPR) antenna altitude and tilt adjustment system is provided. The system includes a pulleys and ropes lifting mechanism connected to servo motors. The system includes a detachment mechanism controlled by a servo motor. The system includes a data processing and control circuit. The system includes a GPS module. The system includes a wireless transmitter and receiver circuit. The system includes infrared sensors. The system includes depth cameras. The system includes a battery. The system includes a voltage regulator.

According to other aspects of the present disclosure, the proposed system includes one or more of the following features. The system operates in automated and remotely controlled modes. In the automated mode, the system automatically adjusts the antenna's altitude and tilt degree according to height variations of the inspected surface and obstacles present in the antenna's path. In the remotely controlled mode, the system transmits height variation data and a real-time video stream through the wireless transmitter and receiver circuit to an operator, who accordingly performs remotely controlled antenna height and tilt degree adjustments. The system includes a detachment mechanism that is activated by the operator in case the system gets stuck while performing inspection or causes destabilization to the drone. The servo motor-based detachment mechanism liberates the drone from the peripheral system, which constantly broadcasts its location through the built-in GPS module, thus facilitating its localization by search teams. The system further performs topographical depth estimation of the surface inspected by the GPR antenna simultaneously along with obstacle detection by utilizing the infrared sensors and depth cameras, which contributes to sensor-fusion based GPR inspection applications by providing a corresponding surface depth map of inner layers inspected by the GPR.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1A:
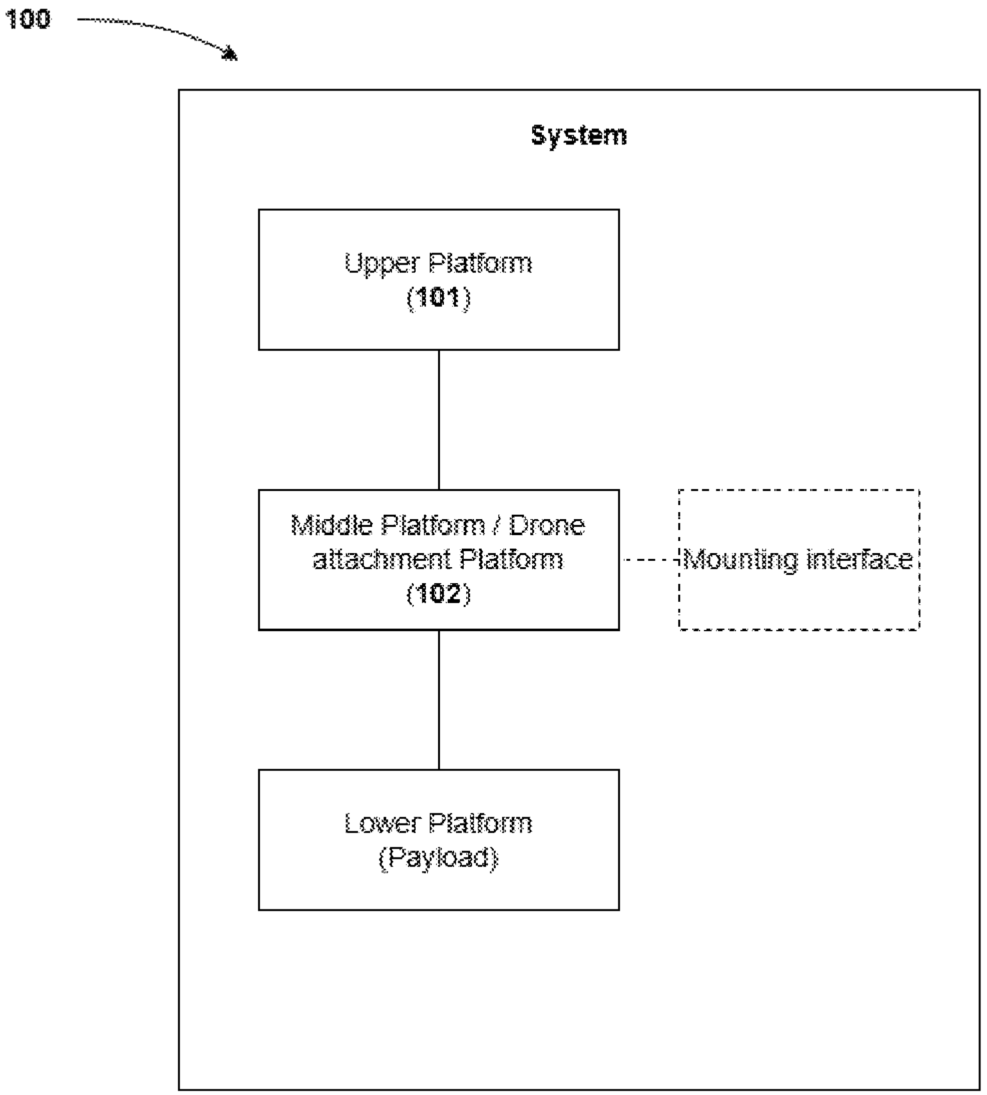
FIGS. 1A and 1B depict a perspective view of a drone-mounted GPR antenna altitude and tilt adjustment peripheral system attached to a drone, according to aspects of the present disclosure.
Figure 1B:
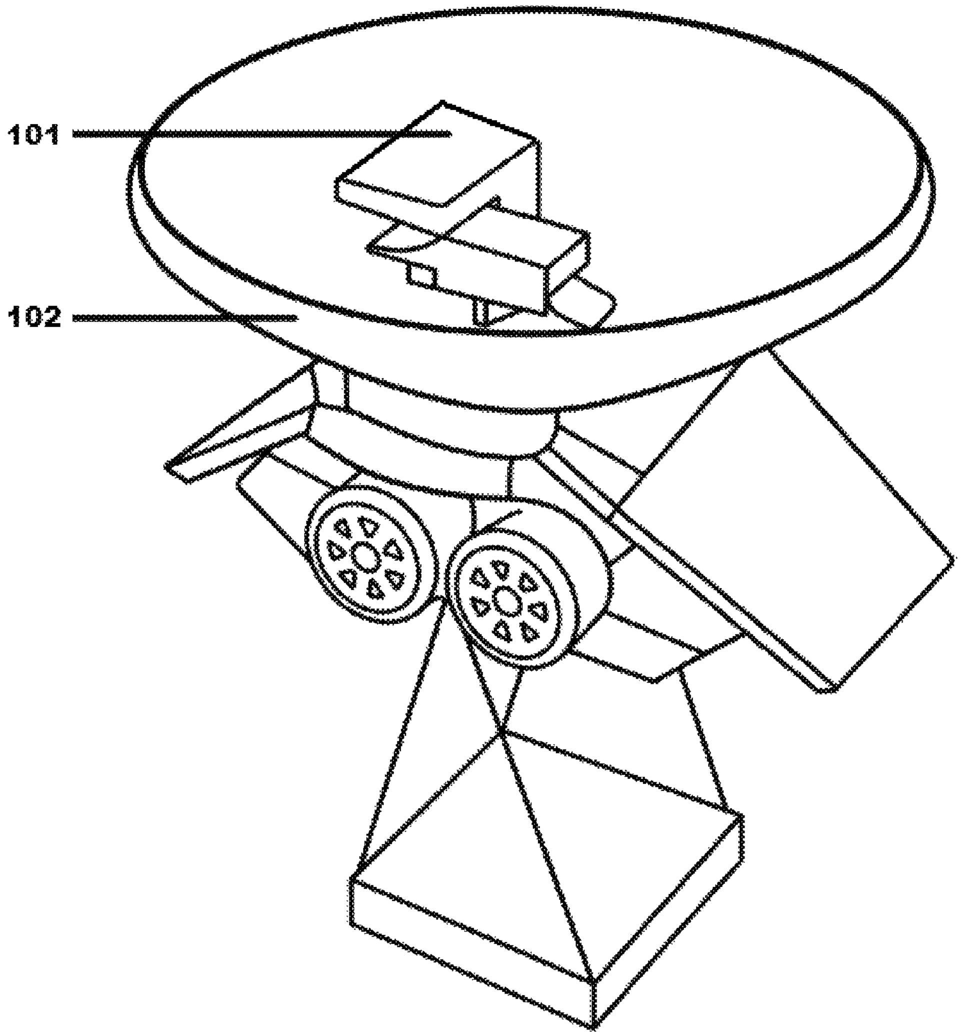

The present disclosure relates to an integrated peripheral drone-mounted Ground Penetrating Radar (GPR) antenna altitude and tilt adjustment system. The system is designed to function as a peripheral system that attaches to existing drones. In some cases, the peripheral configuration facilitates adoption in practical setups by allowing the system to be mounted on various drone platforms without requiring modification to the drone itself. FIG. 1A illustrates a consolidated block diagram of an aerial system. The system comprises an upper platform, a middle platform, and a lower platform arranged in a vertical stack. The upper platform corresponds to a balloon that provides buoyancy and lift. The middle platform corresponds to a drone that provides propulsion, control, and navigation. The lower platform corresponds to a suspended payload supported beneath the middle platform. An attachment is coupled to the system as a peripheral assembly. The upper platform is connected to the middle platform, and the middle platform is connected to the lower platform, by connections such as tethers or cables that transfer load and maintain the spatial relationship between the platforms. FIG. 1B illustrates a block diagram of an aerial system. The system comprises an upper platform and a middle platform. The upper platform corresponds to 101, which provides buoyancy and lift. The middle platform corresponds to drone 102, which provides propulsion, control, and navigation. The upper platform 101 is connected to the drone 102 of the middle platform by a connection such as a tether or cable that transfers load and maintains the spatial relationship between the platforms.

Figure 2:
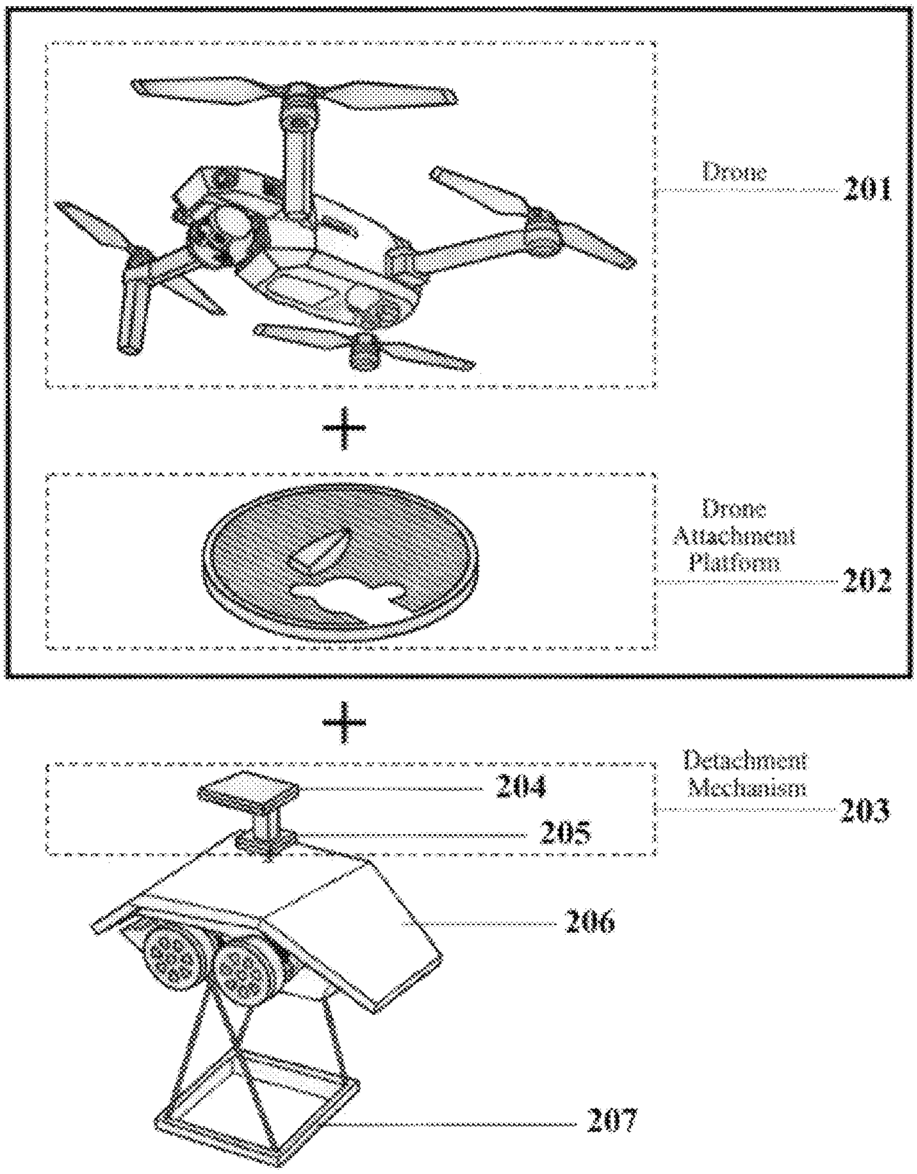
FIG. 2 depicts a three-dimensional view of the peripheral system of FIG. 1 in an assembled configuration, according to an embodiment.
Figure 3:
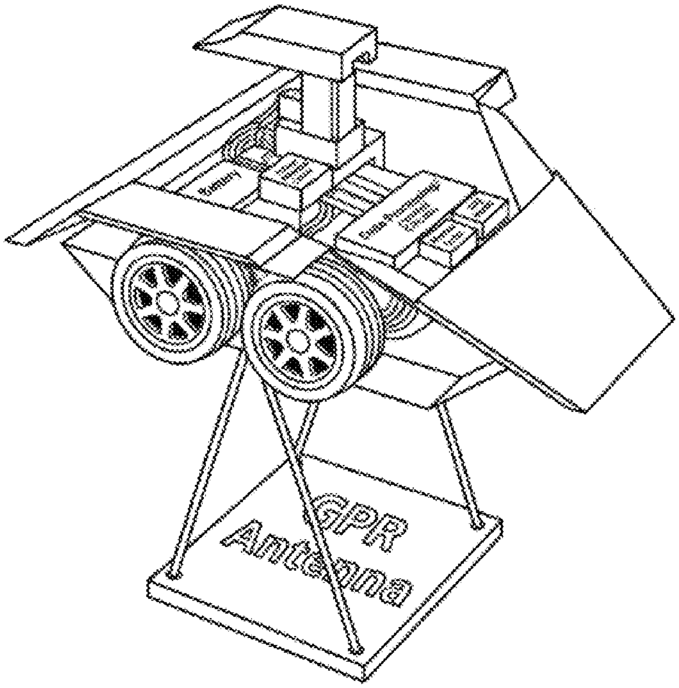
FIG. 3 depicts a three-dimensional view of the peripheral system of FIG. 1 showing a GPR antenna suspended below a housing, according to aspects of the present disclosure.

FIG. 2 is a perspective view illustrating the relationship between the drone 201, the drone attachment platform 202, and the detachment mechanism 203 of the drone-mounted GPR antenna altitude and tilt adjustment peripheral system. As shown in FIG. 2, the drone attachment platform 202 is configured to be attached to the drone 201. The detachment mechanism 203 is disposed on a top side of the middle platform and is configured to selectively connect the system to, or release the system from, the drone attachment platform 202. The detachment mechanism 203 includes a servo motor head 204 and a detachment servo motor 205. The servo motor head 204 is configured to engage the drone attachment platform 202 in a locked position so that the drone attachment platform 202 is connected to the detachment mechanism 203 and the middle platform. When release is required, the detachment servo motor 205 moves the servo motor head 204 to disengage the detachment mechanism 203 from the drone attachment platform 202, thereby separating the drone attachment platform 202 from the detachment mechanism 203 and releasing the inspection system, including the upper platform 206 and the GPR antenna 207, from the drone 201. FIG. 3 is a perspective view of the drone-mounted GPR antenna altitude and tilt adjustment peripheral system showing the lower platform structure with servo motors and the pulley and rope mechanism, including an upper platform 206 and a GPR antenna 207.

The proposed system comprises a four-platform architecture. The four-platform architecture includes a drone attachment platform 1501, an upper platform 1502, a middle platform 1503, and a lower platform 1504. The drone attachment platform 1501 provides a mounting interface between the system and a host drone. The upper platform 1502 houses various electronic components and sensing elements. The middle platform 1503 connects the upper platform 1502 to the lower platform 1504 and provides structural support for the system. The lower platform 1504 supports components associated with altitude and tilt adjustment mechanisms.

Figure 4:
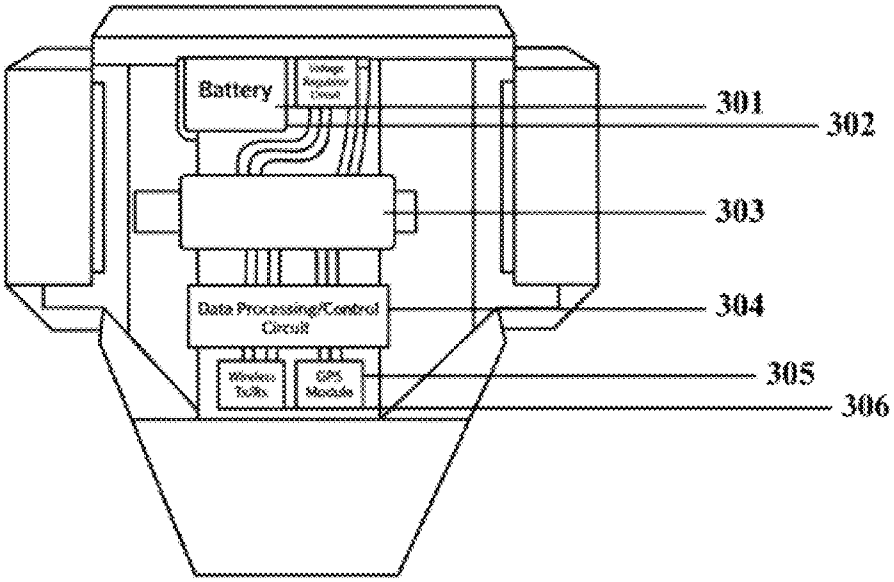
FIG. 4 depicts a top view of an upper platform of the peripheral system of FIG. 1, according to an embodiment.
Figure 5:
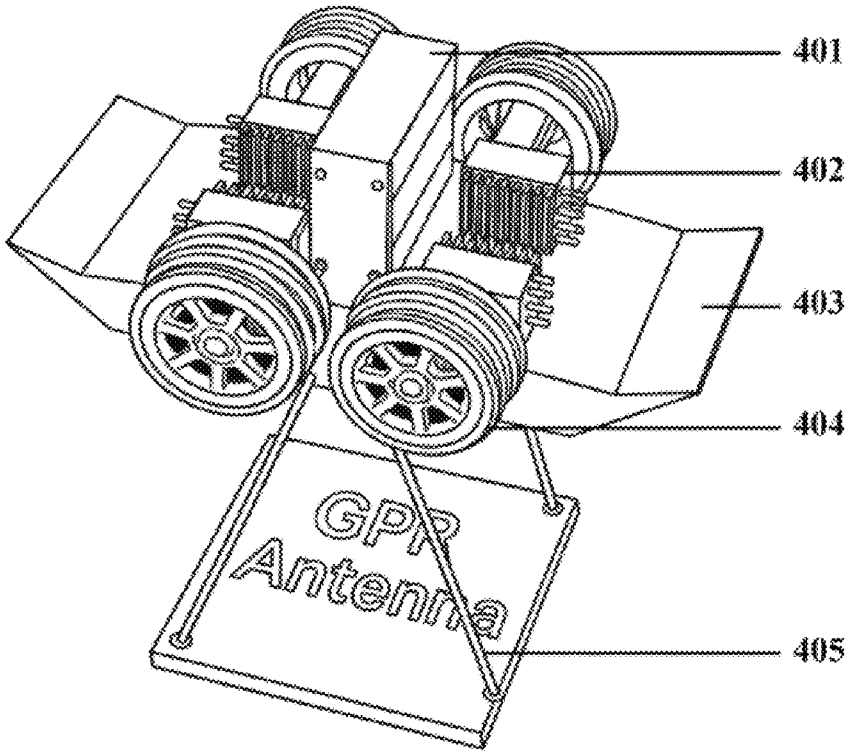
FIG. 5 depicts a detailed view of a lower platform assembly of the peripheral system of FIG. 1, according to aspects of the present disclosure.
Figure 6:
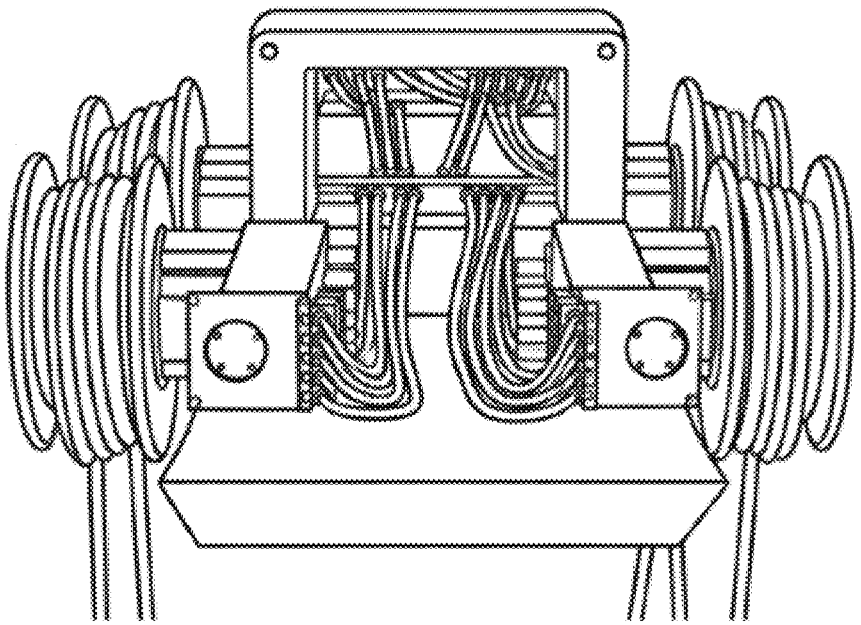
FIG. 6 depicts a view of a servo motor and pulley mechanism of the peripheral system of FIG. 1, according to an embodiment.
Figure 7:
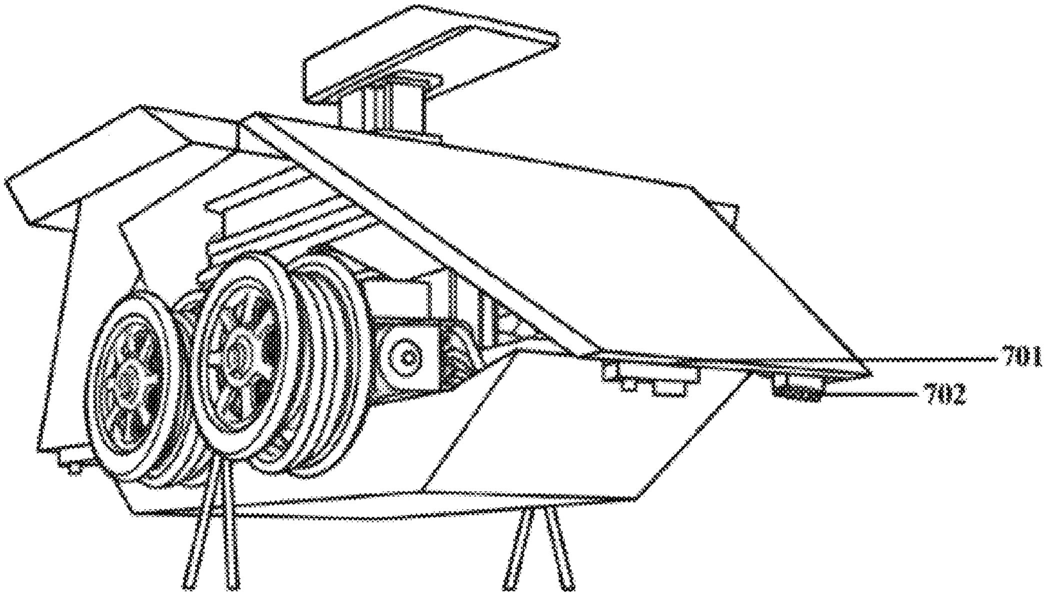
FIG. 7 depicts a side perspective view of the lower platform assembly of the peripheral system of FIG. 1, according to aspects of the present disclosure.
Figure 8:
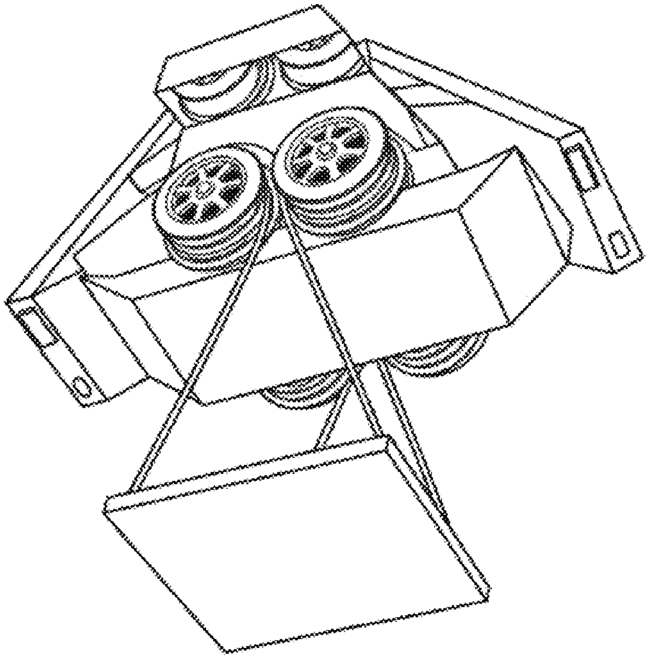
FIG. 8 depicts a three-dimensional view of the lower platform assembly of the peripheral system of FIG. 1 showing a pulley and rope mechanism, according to an embodiment.

FIG. 4 is a top view of the upper platform of the drone-mounted GPR antenna altitude and tilt adjustment peripheral system, including a voltage regulator circuit 301, a battery 302, a middle platform 303, a data processing and control circuit 304, a wireless transmitter and receiver circuit 305, and a GPS module 306. FIG. 5 is a detailed view of the lower platform assembly of the drone-mounted GPR antenna altitude and tilt adjustment peripheral system, including a middle platform 401, a plurality of servo motors 402, a lower platform 403, a plurality of pulleys 404, and a plurality of ropes 405. FIG. 6 is a view of the lower platform assembly showing the servo motor and pulley mechanism with wiring connections extending from the servo motors to the data processing and control circuitry. FIG. 7 is a side perspective view of the lower platform assembly of the drone-mounted GPR antenna altitude and tilt adjustment peripheral system, including an infrared sensor 701 and a depth camera 702. FIG. 8 is a three-dimensional view of the lower platform assembly showing the pulley and rope mechanism with four servo motors equipped with pulleys and ropes extending downward to a GPR antenna mounting surface.

In some cases, the four-platform architecture provides a modular configuration that distributes system components across multiple levels. The drone attachment platform 1501 is fixed to a designated inspection drone. The upper platform 1502, middle platform 1503, and lower platform 1504 are arranged in a vertically stacked configuration below the drone attachment platform. The middle platform 1503 serves as an intermediate structural element that connects the upper platform 1502 to the lower platform 1504. The upper platform 1502 houses a plurality of electronic components and sensing elements. In some cases, the upper platform 1502 contains a battery that provides electrical power to the system. A voltage regulator circuit is positioned on the upper platform 1502 and is connected to the battery. The voltage regulator circuit conditions the electrical power supplied by the battery for distribution to other system components. A data processing/control circuit is further disposed on the upper platform 1502. The data processing/control circuit receives sensor data and generates control signals for various system actuators. A GPS module is located on the upper platform 1502. The GPS module provides location data for the system. A wireless transmitter/receiver (Tx/Rx) circuit is housed on the upper platform 1502. The wireless Tx/Rx circuit enables communication between the system and a remote operator or control station.

In an embodiment, the upper platform 1502 contains sensing elements for surface detection and obstacle identification. Two infrared (IR) sensors are positioned on the upper platform 1502. The two IR sensors are oriented to face a downward direction toward an inspected surface. Two depth cameras are also disposed on the upper platform 1502. The two depth cameras are configured to capture depth images of terrain below the system. The IR sensors and depth cameras provide data to the data processing/control circuit for altitude estimation and obstacle detection. The lower platform 1504 supports components associated with altitude and tilt adjustment mechanisms. In some cases, four servo motors are disposed on the lower platform 1504. The four servo motors are connected to a system of pulleys and ropes. The pulleys and ropes extend from the lower platform 1504 to a GPR antenna suspended below the system. Rotation of each servo motor causes corresponding movement of the ropes through the pulleys, thereby adjusting altitude and tilt of the GPR antenna.

All components of the system are powered by the battery connected to the voltage regulator circuit on the upper platform 1502. The voltage regulator circuit distributes regulated electrical power from the battery to the data processing/control circuit, the GPS module, the wireless Tx/Rx circuit, the IR sensors, the depth cameras, and the servo motors on the lower platform 1504. The middle platform 1503 connects the upper platform to the lower platform 1504. In some cases, the middle platform 1503 provides structural support between the upper platform and the lower platform 1504. A servo motor associated with a detachment mechanism is housed on the middle platform 1503. The servo motor on the middle platform 1503 is positioned at a junction between the drone attachment platform 1501 and the integrated system body. The servo motor on the middle platform 1503 is configured to actuate the detachment mechanism when activated.

The GPR antenna is suspended below the system by a plurality of cables. The plurality of cables extends from the lower platform to attachment points on the GPR antenna. In some cases, the plurality of cables is routed through a corresponding plurality of pulleys disposed on the lower platform. Each pulley is mechanically coupled to a respective servo motor. The servo motors are configured to rotate in response to control signals received from the data processing/control circuit. Rotation of each servo motor results in pulling or pushing of the cables connected to the respective pulley. When a servo motor rotates in a first direction, the servo motor causes the corresponding cable to be pulled, thereby raising a portion of the GPR antenna connected to that cable. When the servo motor rotates in a second direction opposite the first direction, the servo motor causes the corresponding cable to be released or pushed, thereby lowering the portion of the GPR antenna connected to that cable. The pulling and pushing of the cables adjust both altitude and tilt degree of the GPR antenna platform relative to the lower platform.

In an embodiment, the servo motors provide constant position feedback to the data processing/control circuit. The position feedback includes information regarding rotational position of each servo motor. The data processing/control circuit receives the position feedback from each servo motor and uses the position feedback to determine a current altitude and tilt degree of the GPR antenna. The constant position feedback enables accurate altitude and tilt degree control by allowing the data processing/control circuit to compare actual servo motor positions with commanded positions and to adjust as needed. The data processing/control circuit generates control signals for the servo motors based on sensor data received from the IR sensors and depth cameras. The control signals specify rotation speed and rotation degree for each servo motor. The servo motors execute the control signals while simultaneously transmitting position feedback to the data processing/control circuit. The closed-loop configuration between the data processing/control circuit and the servo motors provides precise control over GPR antenna positioning.

Figure 9:
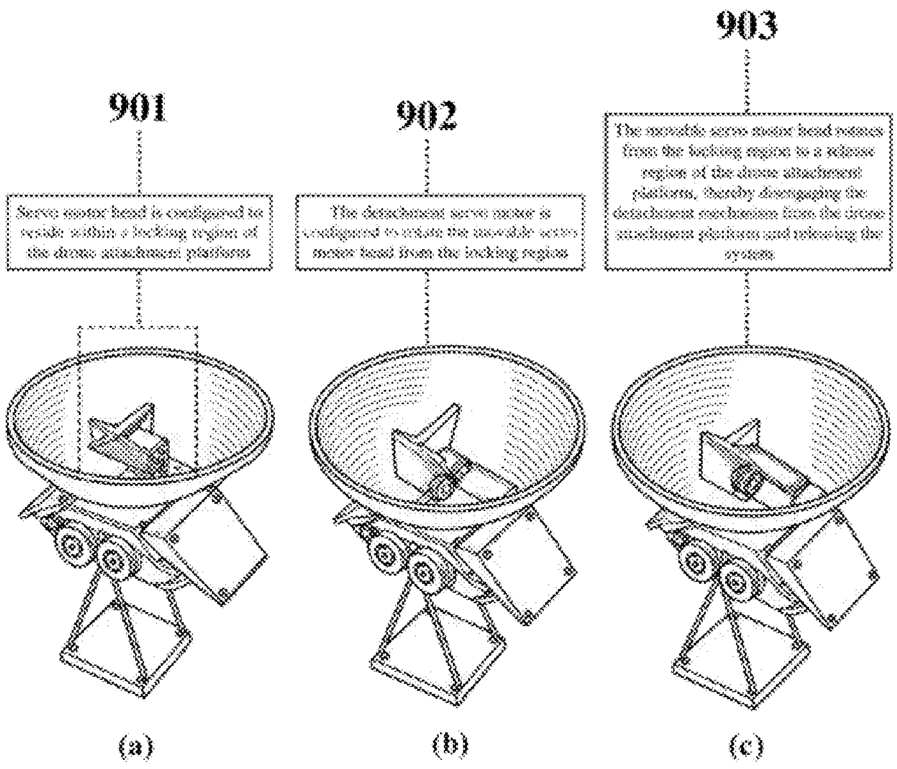
FIG. 9 depicts a sequence of views illustrating tilt adjustment capability of the peripheral system of FIG. 1, according to aspects of the present disclosure.
Figure 10:
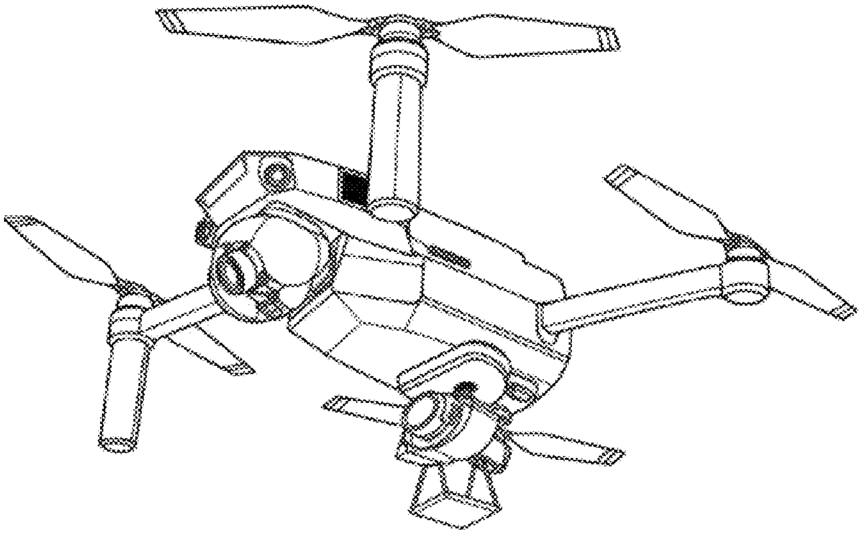
FIG. 10 depicts a bottom perspective view of the peripheral system of FIG. 1 attached to a quadcopter drone, according to an embodiment.
Figure 11:
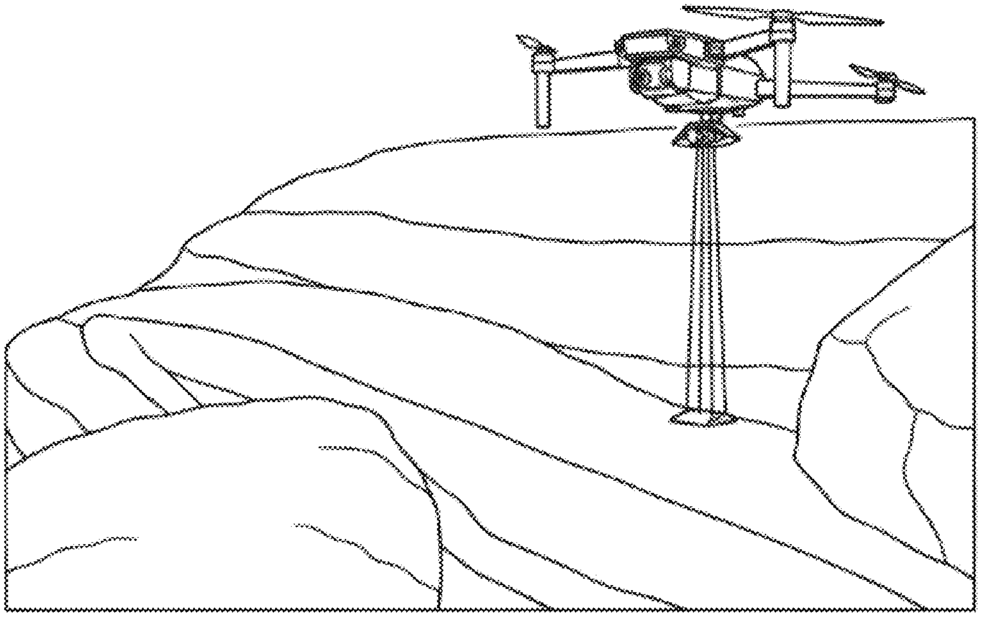
FIG. 11 depicts an illustration of the peripheral system of FIG. 1 in operation over a rocky terrain environment, according to aspects of the present disclosure.
Figure 12:
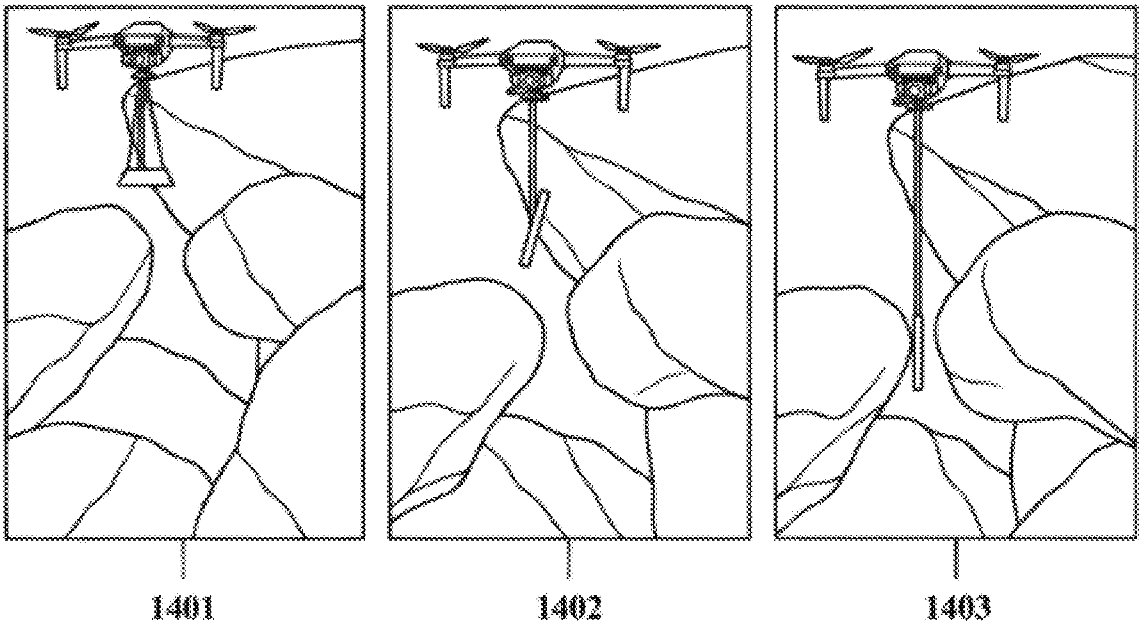
FIG. 12 depicts a sequential illustration of a GPR antenna navigating through a rocky formation, according to an embodiment.
Figure 13:
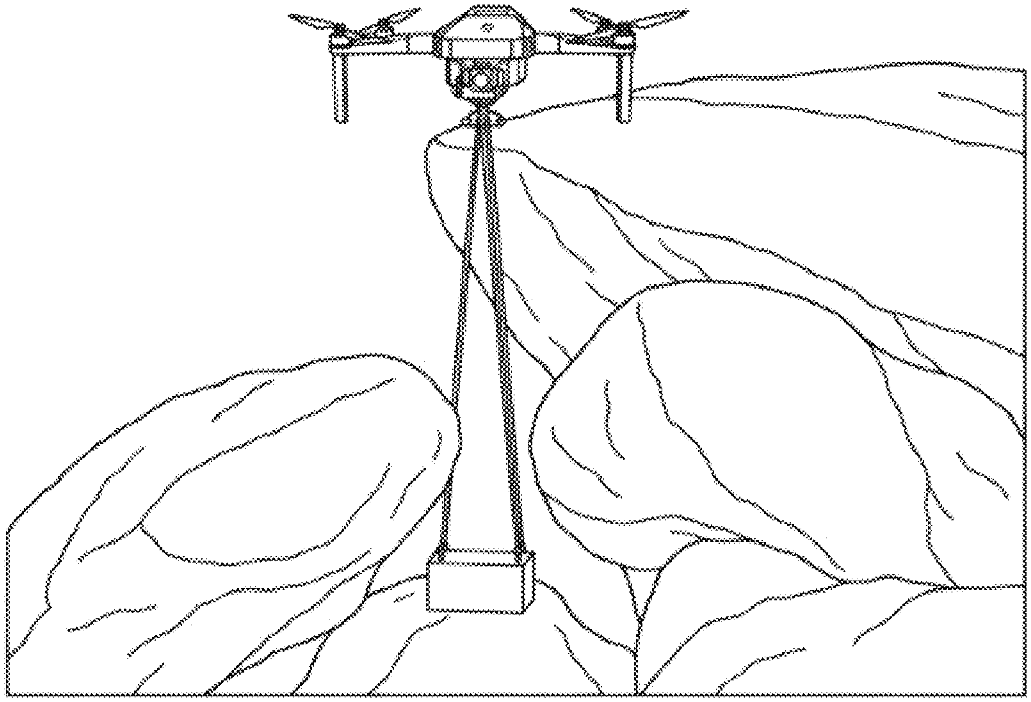
FIG. 13 depicts an illustration of the peripheral system of FIG. 1 in operation over a rocky outcrop, according to aspects of the present disclosure.

FIG. 9 is a sequential illustration showing operation of the detachment mechanism of the drone-mounted GPR antenna altitude and tilt adjustment peripheral system. As shown in view (a), the movable servo motor head 901 is configured to reside within a locking region of the drone attachment platform under normal operating conditions, thereby maintaining engagement between the drone attachment platform and the detachment mechanism. As shown in view (b), the detachment servo motor 902 is configured to rotate the movable servo motor head from the locking region. As shown in view (c), the movable servo motor head rotates from the locking region to a release region 903 of the drone attachment platform, thereby disengaging the detachment mechanism from the drone attachment platform and releasing the system from the drone attachment platform. FIG. 10 is a bottom perspective view of the drone-mounted GPR antenna altitude and tilt adjustment peripheral system attached to a quadcopter drone, showing the peripheral system with sensor components including infrared sensors and depth cameras oriented to face a downward direction. FIG. 11 is an illustration of the drone-mounted GPR antenna altitude and tilt adjustment peripheral system in operation over a rocky terrain environment, showing infrared beams projecting downward onto a rock surface to illustrate height sensing and obstacle detection functionality. FIG. 12 is a sequential illustration labeled 1401, 1402, and 1403 depicting a drone-mounted GPR system navigating through a rocky formation with tight spaces, showing the GPR antenna transitioning from a horizontal orientation to a vertical orientation to pass through a narrow gap between rocks. FIG. 13 is an illustration of the drone-mounted GPR antenna altitude and tilt adjustment peripheral system in operation over a rocky terrain environment, showing the GPR antenna suspended via the rope and pulley mechanism and positioned in proximity to an irregular rocky surface.

Figure 14:
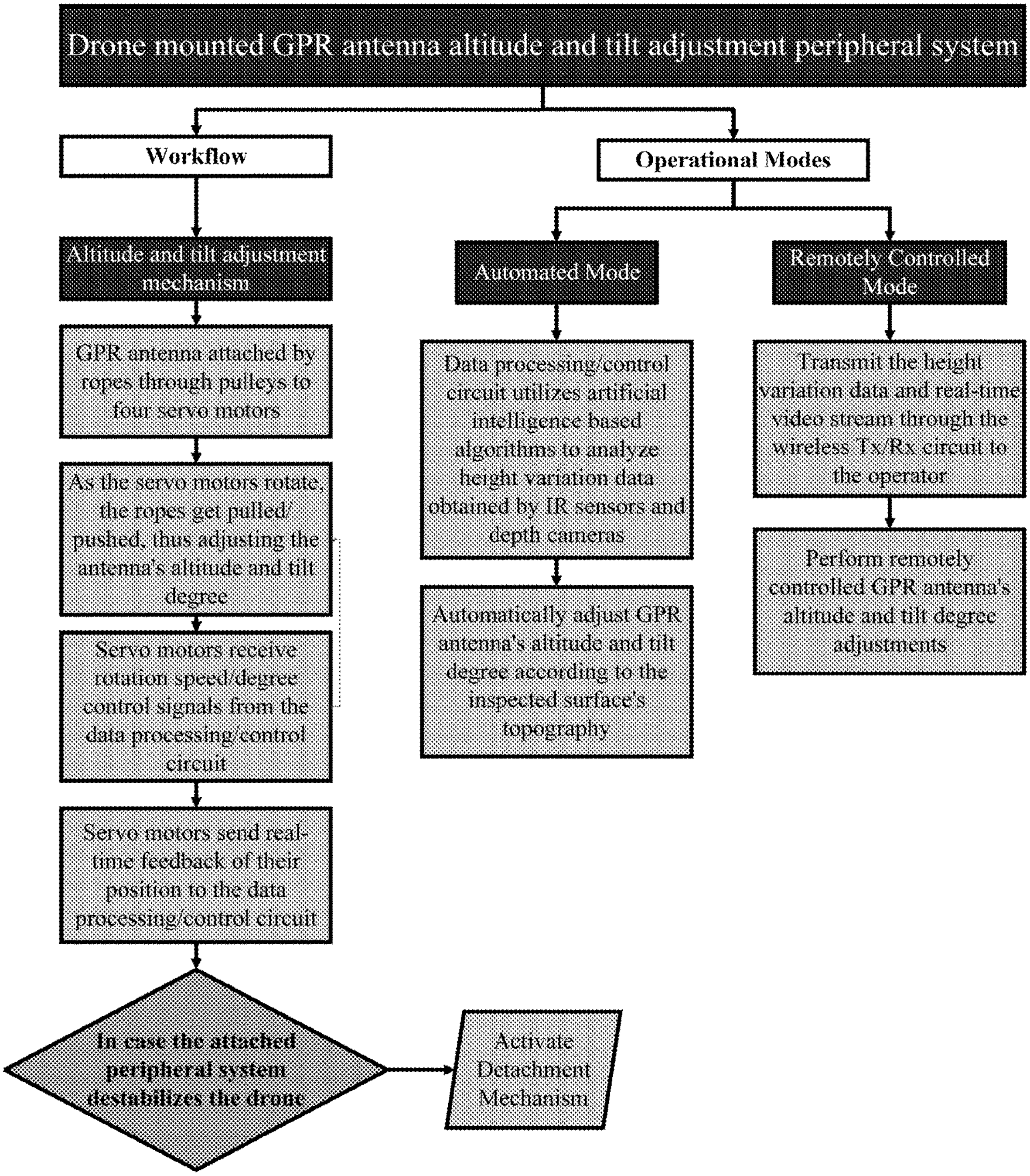
FIG. 14 depicts a flowchart illustrating workflow and operational modes of the peripheral system of FIG. 1, according to an embodiment.
Figure 15:
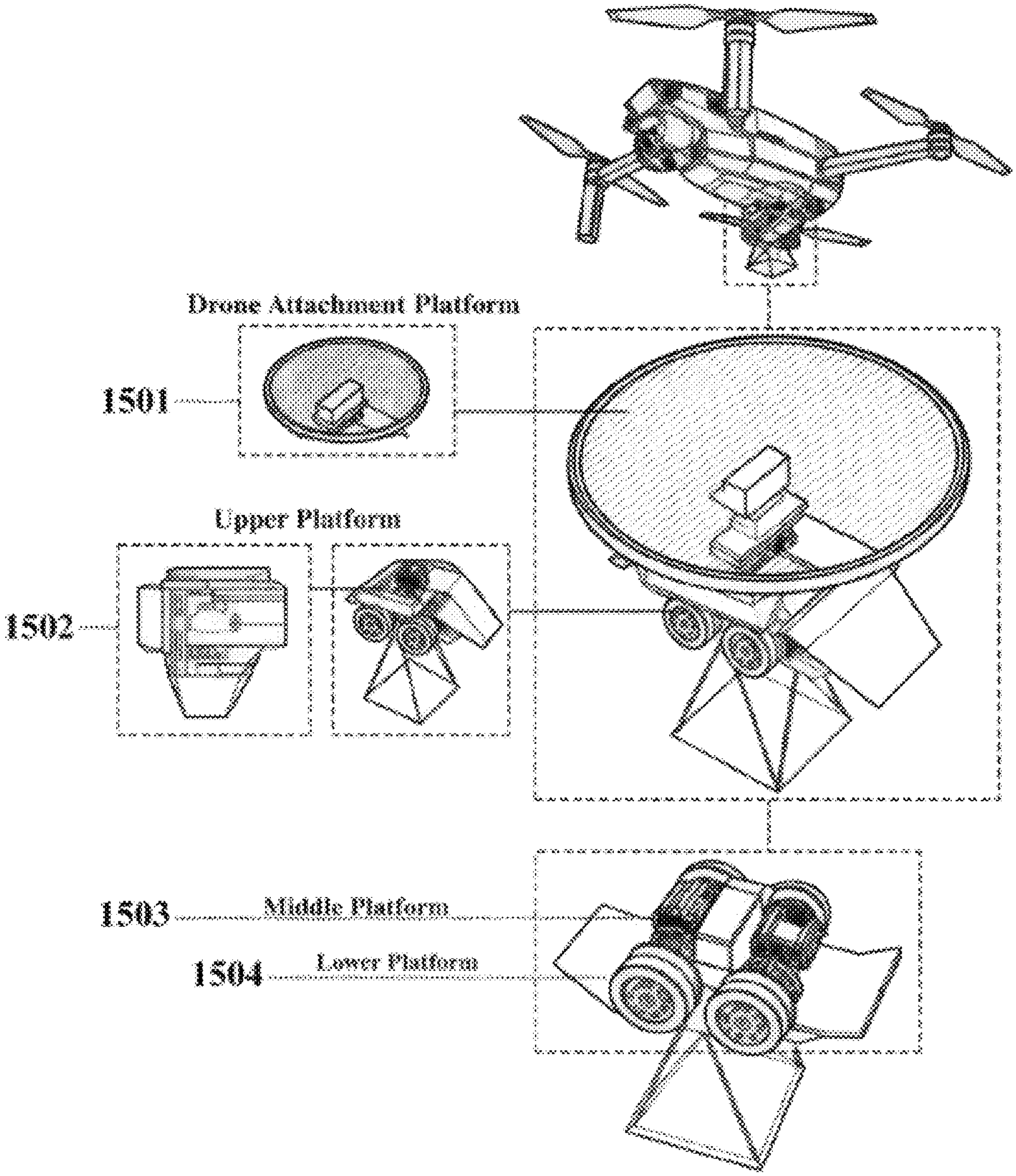
FIG. 15 depicts an illustration of the system showing the attachment, upper platform, middle platform, and lower platform connected together.

FIG. 14 is a flowchart illustrating the workflow and operational modes of the drone-mounted GPR antenna altitude and tilt adjustment peripheral system, including a workflow branch describing the altitude and tilt adjustment mechanism and an operational modes branch depicting automated mode and remotely controlled mode.

Figure 18:
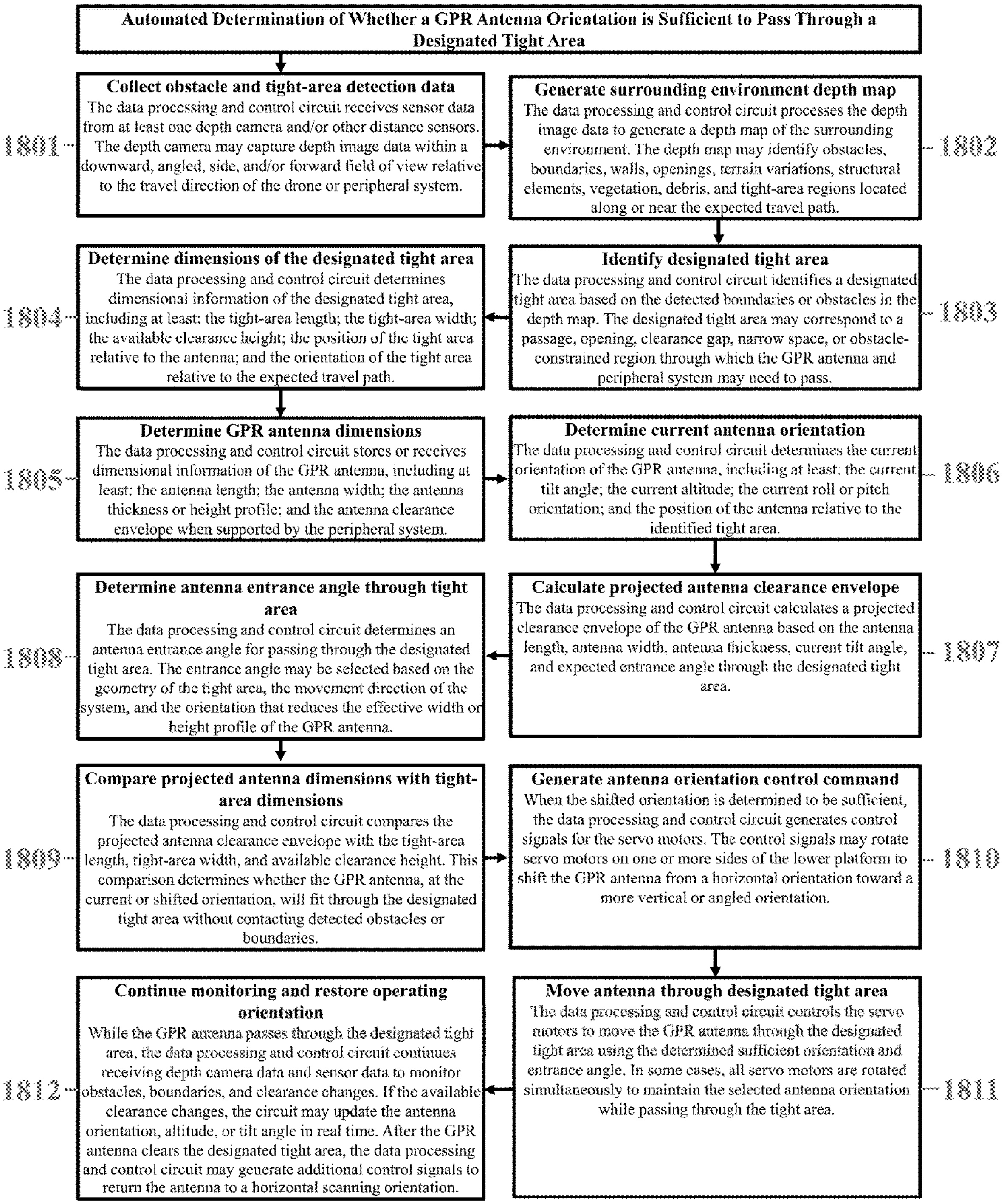
FIG. 18 depicts a flowchart illustrating a process for determining whether a shifted orientation of the GPR antenna is sufficient to pass through a designated tight area based on obstacle and tight-area detection data, a surrounding environment depth map, tight-area dimensions, GPR antenna dimensions, antenna orientation, projected antenna clearance envelope, and servo-motor-controlled antenna movement.
Figure 19:
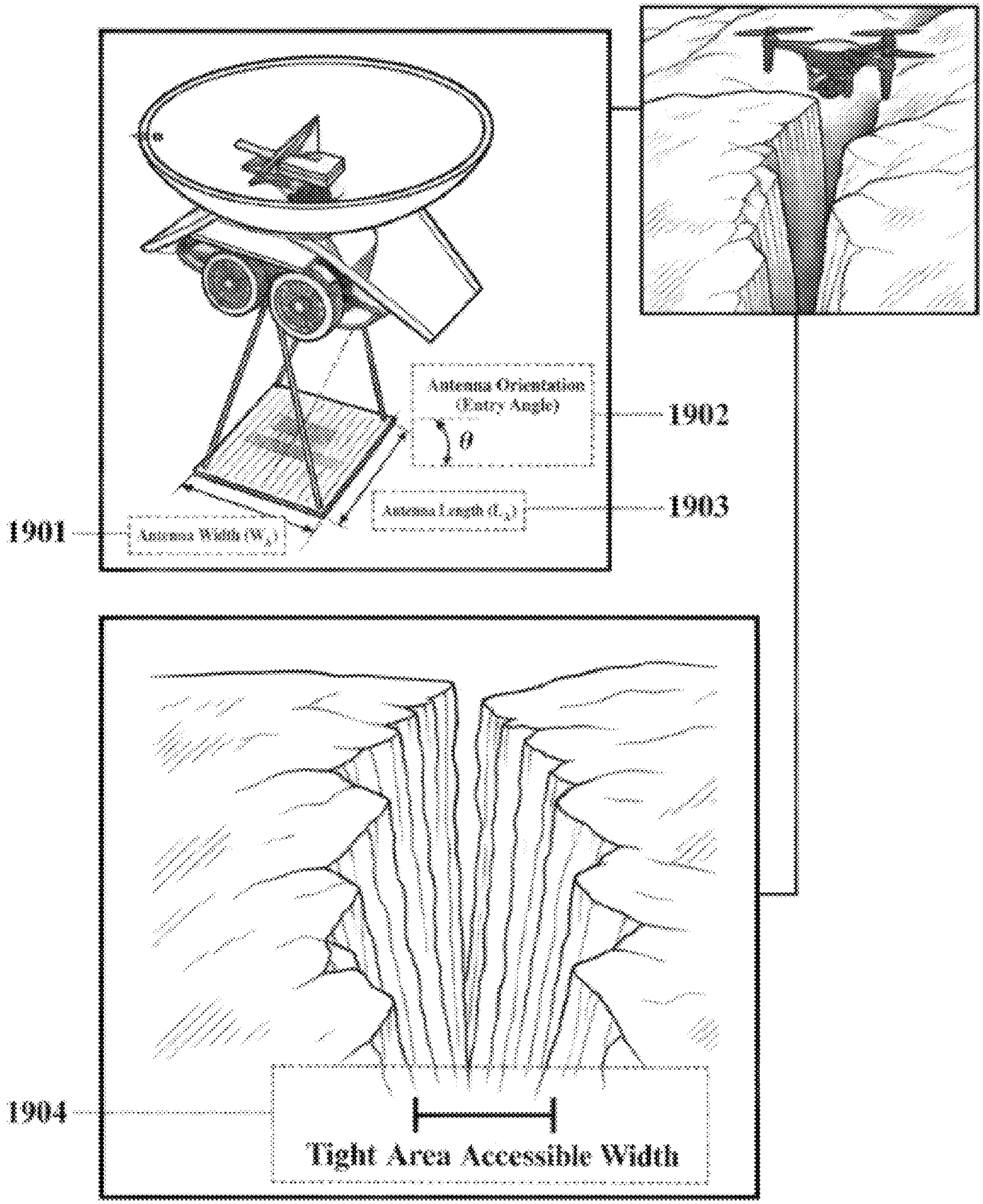
FIG. 19 depicts an illustration of a GPR antenna and a designated tight area, showing the relationship between the antenna width, antenna length, antenna entrance angle, and tight-area accessible width used by the data processing/control circuit to determine whether the antenna can pass through the designated tight area.

In some cases, all servo motors rotate simultaneously to enable the GPR antenna to pass through a designated tight area. As illustrated in FIG. 18, the data processing/control circuit first collects obstacle and tight-area detection data 1801 from at least one depth camera and/or other distance sensors. The depth camera may capture depth image data within a downward, angled, side, and/or forward field of view relative to the travel direction of the drone or peripheral system. This permits the system to detect obstacles, boundaries, cracks, openings, clearance gaps, narrow spaces, or other tight areas located beneath, around, or forward of the GPR antenna. The data processing/control circuit processes the received detection data to generate a surrounding environment depth map 1802. The depth map may identify obstacles, boundaries, walls, openings, terrain variations, structural elements, vegetation, debris, and tight-area regions located along or near the expected travel path. Based on the depth map, the data processing/control circuit identifies a designated tight area 1803 through which the GPR antenna may need to pass. The designated tight area may correspond to a crack, passage, opening, clearance gap, narrow space, or obstacle-constrained region. After identifying the designated tight area, the data processing/control circuit determines the dimensions of the designated tight area 1804, including at least the tight-area length, tight-area width, available clearance height, position of the tight area relative to the antenna, and orientation of the tight area relative to the expected travel path. As shown in FIG. 19, the tight-area accessible width 1904 may be determined from the opening or usable clearance of the detected tight area. The data processing/control circuit also determines or retrieves dimensional information of the GPR antenna 1805, including the antenna width 1901, antenna length 1903, and antenna thickness or height profile. The circuit further determines the current antenna orientation 1806, including the current tilt angle, current altitude, roll or pitch orientation, and position of the antenna relative to the identified tight area. The antenna orientation may include an entrance angle 1902, which represents the angle at which the GPR antenna is positioned to enter or pass through the designated tight area. The data processing/control circuit calculates a projected antenna clearance envelope 1807 based on the antenna width 1901, antenna length 1903, antenna thickness or height profile, current tilt angle, and entrance angle 1902. The circuit then determines an antenna entrance angle through the tight area 1808 and compares the projected antenna dimensions with the tight-area dimensions 1809, including the tight-area accessible width 1904 and other available clearances. This comparison determines whether the GPR antenna, in its current or shifted orientation, can pass through the designated tight area without contacting detected obstacles or boundaries. When the shifted orientation is determined to be sufficient, the data processing/control circuit generates an antenna orientation control command 1810. The control command may rotate servo motors on one or more sides of the lower platform to shift the GPR antenna from a horizontal orientation toward a more vertical or angled orientation. The data processing/control circuit may also command all servo motors to rotate simultaneously so that the GPR antenna moves through the designated tight area 1811 while maintaining the selected antenna orientation and entrance angle. During passage, the data processing/control circuit continues monitoring sensor data and clearance changes 1812. If the available clearance changes, the circuit may update the antenna orientation, altitude, or tilt angle in real time. After the GPR antenna clears the designated tight area, the data processing/control circuit may generate additional control signals to return the antenna to a horizontal or operational scanning orientation.

The infrared sensors provide short-range height measurement capability. The infrared sensors emit infrared radiation toward the inspected surface and detect reflected infrared radiation returning from the inspected surface. Based on characteristics of the reflected infrared radiation, the infrared sensors generate height measurement data corresponding to distances between the system and the inspected surface. The short-range height measurement provided by the infrared sensors are suitable for detecting surface height variations in close proximity to the GPR antenna. The depth cameras provide long-range obstacle detection capability. The depth cameras capture depth images that represent three-dimensional information about terrain and objects below the system. The depth images include distance information for multiple points within a field of view of each depth camera. The long-range obstacle detection provided by the depth cameras enable identification of obstacles at distances greater than the effective range of the infrared sensors.

In an embodiment, the dual-range sensing capability provided by the combination of infrared sensors and depth cameras enables detection across both short-range and long-range distances. The infrared sensors detect surface height variations and obstacles within a first distance range corresponding to short-range detection. The depth cameras detect obstacles and terrain features within a second distance range corresponding to long-range detection. The second distance range extend beyond the first distance range, thereby providing advance warning of approaching obstacles or terrain changes.

The data processing/control circuit receive data from both the infrared sensors and the depth cameras. The data processing/control circuit jointly analyze the data obtained from the infrared sensors and the depth cameras. The joint analysis combines short-range height measurement data from the infrared sensors with long-range obstacle detection data from the depth cameras. Based on the joint analysis, the data processing/control circuit determine a suitable altitude adjustment for the GPR antenna. In an embodiment, the joint analysis of data from the infrared sensors and depth cameras enables the system to estimate surface height variations. The surface height variations correspond to changes in elevation of the inspected surface along a path of the GPR antenna. The data processing/control circuit process the combined sensor data to generate a representation of surface topography beneath the system. The representation of surface topography informs altitude adjustment decisions to maintain the GPR antenna at a desired proximity to the inspected surface.

Figure 17:
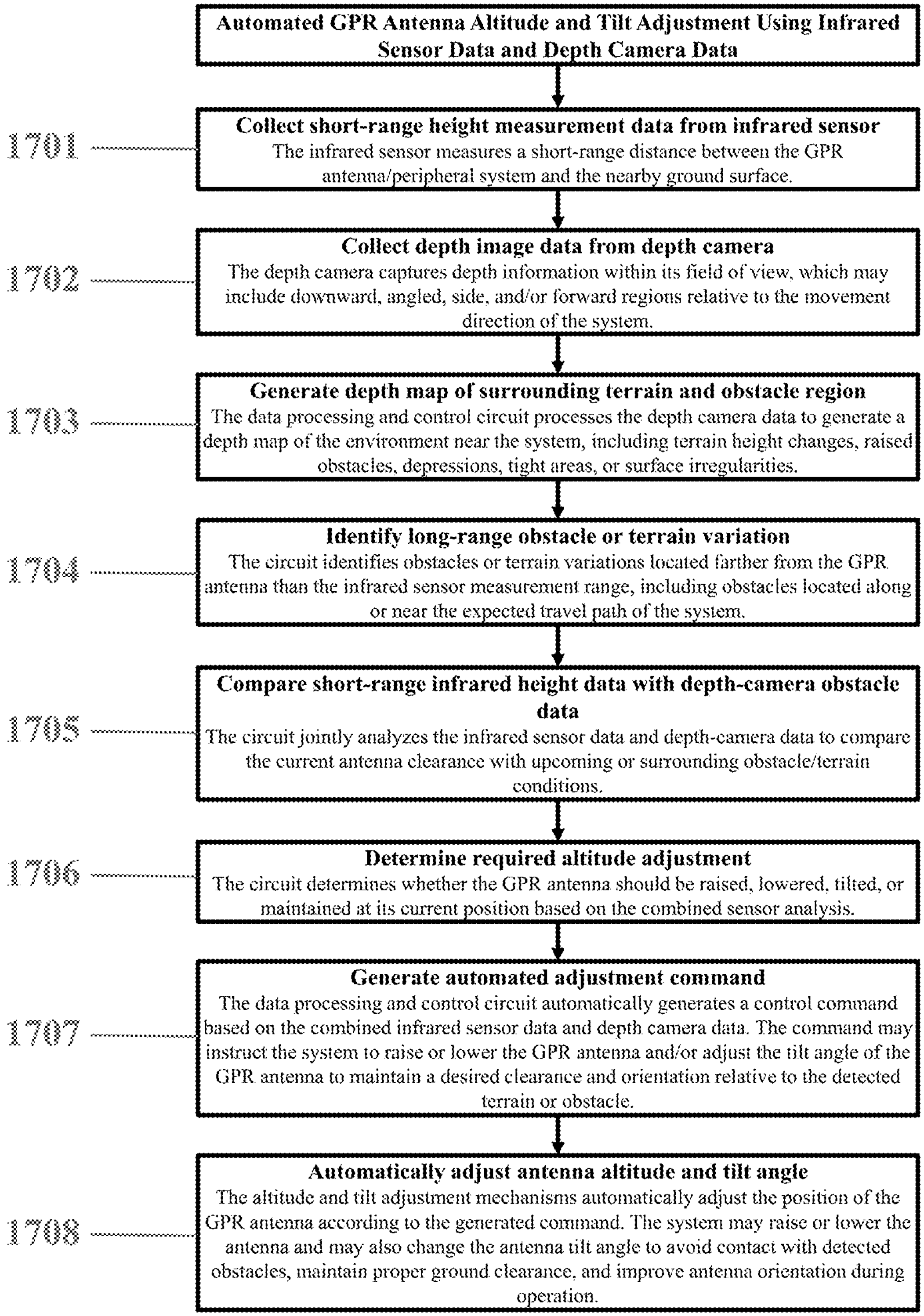
FIG. 17 depicts a flowchart illustrating automated GPR antenna altitude and tilt adjustment using infrared sensor data and depth camera data, including collecting short-range height measurement data, generating depth-based terrain and obstacle information, comparing sensor data, determining required adjustments, and automatically adjusting the altitude and tilt angle of the GPR antenna.

The joint analysis also enables the system to detect obstacles, terrain variations, and surface irregularities in or near a travel path of the GPR antenna. As shown in FIG. 17, the data processing/control circuit first receives short-range height measurement data 1701 from the at least one infrared sensor. The short-range height measurement data 1701 indicates a distance between the GPR antenna or peripheral system and a nearby ground surface. The data processing/control circuit also receives depth image data 1702 from the at least one depth camera. The depth image data 1702 may include depth information captured within a field of view of the depth camera, including downward, angled, side, and/or forward regions relative to the movement direction of the system. Accordingly, the depth camera is not limited to detecting only directly below the system, and may be used to detect obstacles or terrain changes located along or near the expected travel path of the GPR antenna. The data processing/control circuit processes the depth image data 1702 to generate a depth map 1703 of a surrounding terrain and obstacle region. The depth map 1703 may identify terrain height changes, raised obstacles, depressions, tight areas, surface irregularities, rocks, debris, vegetation, structural elements, or other objects that may affect movement of the GPR antenna. Based on the depth map 1703, the data processing/control circuit identifies long-range obstacles or terrain variations 1704 located farther from the GPR antenna than the measurement range of the infrared sensor. The data processing/control circuit then compares the short-range infrared height data with the depth-camera obstacle data 1705 to evaluate both the current antenna clearance and upcoming or surrounding obstacle/terrain conditions. Based on this comparison, the data processing/control circuit determines a required altitude adjustment 1706, including whether the GPR antenna should be raised, lowered, tilted, or maintained at its current position. In some cases, the system operates in an automated mode. In the automated mode, the data processing/control circuit generates an automated adjustment command 1707 based on the combined infrared sensor data and depth camera data. The automated adjustment command 1707 may instruct the altitude and tilt adjustment mechanisms to raise or lower the GPR antenna and/or adjust a tilt angle of the GPR antenna to maintain a desired clearance and orientation relative to the detected terrain or obstacle. The altitude and tilt adjustment mechanisms then automatically adjust the antenna altitude and tilt angle 1708 according to the generated command. In this manner, the system may avoid contact with detected obstacles, maintain proper ground clearance, and improve antenna orientation during operation.

The automated mode is configured to ensure that the GPR antenna remains at a proximity to the inspected surface that is as close as possible without causing friction or collision-related damage to the antenna. The artificial intelligence-based analysis evaluates surface height variations and obstacle positions to calculate an altitude that maintains the GPR antenna near the inspected surface while avoiding contact. The data processing/control circuit continuously updates the altitude and tilt degree of the GPR antenna as the system traverses over varying terrain. In some cases, the artificial intelligence-based analysis includes evaluation of multiple factors to determine appropriate antenna positioning. The factors include current surface height beneath the GPR antenna, detected obstacles in the path of the GPR antenna, rate of change of surface height, and predicted terrain features based on depth camera data. The data processing/control circuit weighs the multiple factors to generate control signals that balance proximity to the inspected surface against risk of collision or friction damage.

The system utilizes artificial intelligence-based processing algorithms, including computer vision-based distance estimation techniques, to facilitate navigation through confined spaces. As shown in FIG. 18, the data processing/control circuit receives obstacle and tight-area detection data 1801 and generates a surrounding environment depth map 1802. The circuit then identifies a designated tight area 1803 and determines dimensions of the designated tight area 1804, including the tight-area accessible width 1904 shown in FIG. 19. The circuit also determines the GPR antenna dimensions 1805, including antenna width 1901 and antenna length 1903, and determines the current antenna orientation 1806, including the antenna entrance angle 1902. The circuit calculates a projected antenna clearance envelope 1807 and compares the projected antenna dimensions with the tight-area dimensions 1809 to determine whether the antenna, in its current or proposed shifted orientation, can pass through the designated tight area without contacting detected obstacles or boundaries.

The artificial intelligence-based processing algorithms evaluate whether the GPR antenna can pass through the designated tight area in a current orientation. As shown in FIG. 18, the data processing/control circuit calculates a projected antenna clearance envelope 1807 based on the antenna dimensions 1805, current antenna orientation 1806, and antenna entrance angle 1902 shown in FIG. 19. The circuit then compares the projected antenna dimensions with the tight-area dimensions 1809, including the tight-area accessible width 1904. If the current orientation is insufficient, the circuit generates an antenna orientation control command 1810 to shift the GPR antenna from a horizontal orientation toward a vertical or angled orientation. The adjusted orientation is re-evaluated, and when sufficient, the circuit commands the servo motors to move the antenna through the designated tight area 1811 while continuing to monitor clearance changes 1812. If sufficient clearance cannot be achieved, the circuit may calculate further orientation adjustments or determine that the tight area is impassable.

In another embodiment, the proposed system operates in a remotely controlled mode. In the remotely controlled mode, the data processing/control circuit transmits height variation data and a live video stream through the wireless Tx/Rx circuit to an operator. The height variation data includes information derived from the infrared sensors and depth cameras regarding surface elevation changes and distances between the GPR antenna and the inspected surface. The live video stream includes real-time imagery captured by the depth cameras showing terrain and obstacles beneath the system. The operator receives the height variation data and live video stream at a remote-control station. The remote-control station includes a display device configured to present the live video stream to the operator. The remote-control station also includes interface elements that display the height variation data in a format readable by the operator. Based on the received height variation data and live video stream, the operator assesses current conditions beneath the GPR antenna and determines appropriate adjustments to antenna positioning.

In the remotely controlled mode, the operator performs remotely controlled adjustments to the GPR antenna altitude and tilt degree. The operator inputs adjustment commands through a control interface at the remote-control station. The adjustment commands specify desired changes to altitude, tilt degree, or both altitude and tilt degree of the GPR antenna. The control interface transmits the adjustment commands wirelessly to the system. The wireless Tx/Rx circuit receives the adjustment commands transmitted from the remote-control station. The wireless Tx/Rx circuit relays the received adjustment commands to the data processing/control circuit. The data processing/control circuit interprets the adjustment commands and generates corresponding control signals for the servo motors. The servo motors execute the control signals to adjust the altitude and tilt degree of the GPR antenna according to the operator's commands.

In some cases, the remotely controlled mode enables the operator to make real-time adjustments based on visual observation of the live video stream. The operator observes obstacles, terrain features, or surface conditions in the live video stream that warrant adjustment of the GPR antenna positioning. The operator inputs adjustment commands in response to the observed conditions. The system executes the adjustment commands to reposition the GPR antenna as directed by the operator. The remotely controlled mode provides the operator with situational awareness through the combination of height variation data and live video stream. The height variation data provides quantitative information regarding distances and elevation changes. The live video stream provides qualitative visual information regarding the environment beneath the system. The operator uses both types of information to make informed decisions regarding GPR antenna positioning during inspection operations.

In another embodiment, the proposed system enables passing the GPR antenna through tight spaces and cracks, such as narrow openings, crevices, gaps, or confined passages. As shown in FIG. 18, the data processing/control circuit identifies a designated tight area 1803 and determines tight-area dimensions 1804, including the tight-area accessible width 1904 shown in FIG. 19. The circuit also determines GPR antenna dimensions 1805, including antenna width 1901 and antenna length 1903, and determines the current antenna orientation 1806 and entrance angle 1902. If the projected antenna clearance envelope 1807 indicates that the antenna cannot pass in a horizontal orientation, the circuit generates an antenna orientation control command 1810 to actuate servo motors on one side of the lower platform while maintaining servo motors on the opposite side stationary. This selective actuation pulls cables on one side while maintaining cable length on the opposite side, thereby shifting the GPR antenna from a horizontal orientation toward a vertical or intermediate tilted orientation suitable for passing through the designated tight area.

The pulling of cables on one side of the GPR antenna while maintaining the opposite-side cables stationary shifts the antenna from a horizontal orientation toward a vertical or intermediate tilted orientation. As shown in FIG. 18, the data processing/control circuit determines the current antenna orientation 1806, calculates the projected antenna clearance envelope 1807, and compares the projected antenna dimensions with the tight-area dimensions 1809. Based on this comparison, the circuit generates an antenna orientation control command 1810. The amount of servo motor rotation on the active side controls the degree of orientation shift, while the stationary side maintains antenna stability. The required rotation is calculated based on the GPR antenna dimensions 1805, the tight-area dimensions 1804, and the antenna entrance angle 1902 shown in FIG. 19.

In an embodiment, the GPR antenna performs imaging while in a tilted or vertical position after passing through or entering a designated tight area. As shown in FIG. 18, once the projected antenna dimensions are compared with the tight-area dimensions 1809 and the orientation is determined to be sufficient, the data processing/control circuit generates an antenna orientation control command 1810 and moves the antenna through the designated tight area 1811. The adjusted orientation may correspond to the antenna entrance angle 1902 shown in FIG. 19. While in the adjusted orientation, the GPR antenna may capture radar data from surfaces or subsurface features accessible through the tight area. During and after passage, the circuit continues monitoring clearance changes 1812 and may maintain the tilted orientation for imaging or generate control signals to return the antenna to a horizontal scanning orientation when sufficient clearance is available.

The decision to maintain a tilted orientation or to return to the original horizontal orientation depends on the observed geometry of the inspection area. If the observed geometry includes additional tight spaces, irregular surfaces, or obstacles that favor a tilted orientation, the GPR antenna continues imaging in the tilted position. If the observed geometry includes open areas or flat surfaces that favor a horizontal orientation, the GPR antenna returns to the original horizontal orientation for continued imaging. The data processing/control circuit continuously evaluates the observed geometry and adjusts the antenna orientation as conditions change during the inspection operation.

In some cases, the system includes a detachment mechanism that enables separation of the peripheral system from the drone. The detachment mechanism is activated remotely by an operator. The remote activation occurs when the peripheral system becomes stuck during an inspection operation. The remote activation also occurs when the peripheral system causes instability to the drone while in operation. The detachment mechanism allows the drone to be liberated from the peripheral system, thereby preserving the drone when the peripheral system encounters conditions that prevent continued safe operation. Under normal operating conditions, a servo motor head associated with the detachment mechanism resides securely within the drone attachment platform. The servo motor head is positioned within a cavity or recess of the drone attachment platform 1501 such that the servo motor head engages with corresponding structure of the drone attachment platform. The engagement between the servo motor head and the drone attachment platform 1501 maintains a secure mechanical connection between the peripheral system and the drone during normal flight and inspection operations.

When the detachment mechanism is activated, the servo motor associated with the detachment mechanism rotates. The servo motor rotates approximately 180 degrees from an initial position. As the servo motor rotates, the servo motor head moves through an arc within the drone attachment platform. The rotation of the servo motor causes the servo motor head to travel from an engaged position toward an empty region of the drone attachment platform. Upon completing the 180-degree rotation, the servo motor head reaches the empty region of the drone attachment platform. The empty region corresponds to a portion of the drone attachment platform 1501 that lacks structure for engaging with the servo motor head. When the servo motor head reaches the empty region, the servo motor head loses contact with the drone attachment platform. Without the mechanical engagement between the servo motor head and the drone attachment platform, the peripheral system is no longer secured to the drone. After the servo motor head loses contact with the drone attachment platform, the peripheral system falls away from the drone due to gravity. The weight of the peripheral system, including the upper platform 1502, middle platform 1503, lower platform 1504, and suspended GPR antenna, causes the peripheral system to descend when the mechanical connection to the drone is released. The drone, freed from the peripheral system, then continues flight operations or return to a designated location.

Figure 16:
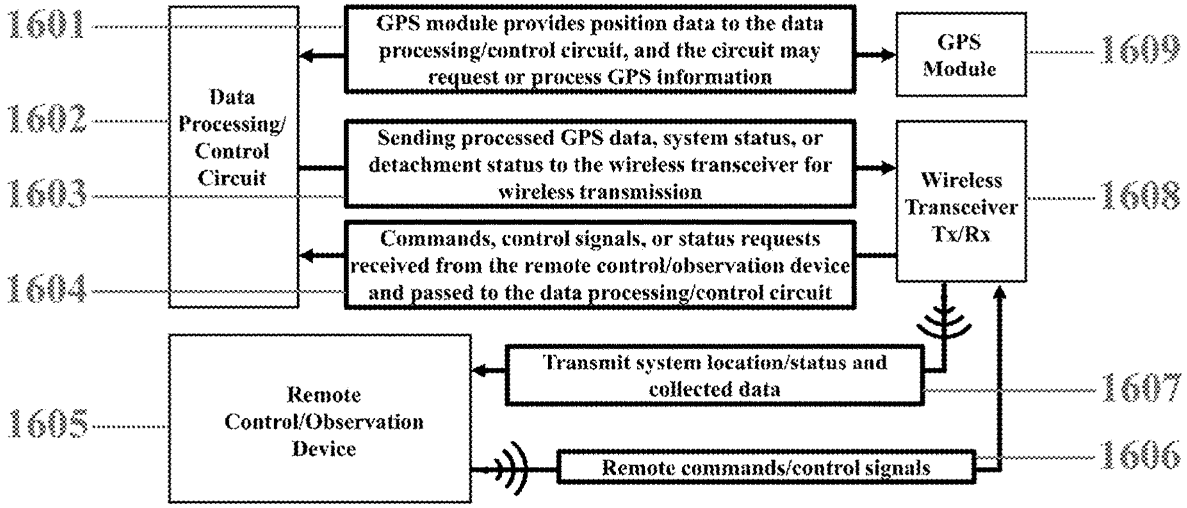
FIG. 16 depicts an illustration of the communication architecture between the GPS module, data processing/control circuit, wireless transceiver, and remote control/observation device for transmitting system location/status data and receiving remote control commands.

In some cases, the detached peripheral system communicates location and status information to facilitate retrieval after a detachment event. As shown in FIG. 16, the GPS module 1609 is configured to provide position data 1601 to the data processing/control circuit 1602. The data processing/control circuit 1602 may request GPS information from the GPS module 1609, receive the position data 1601, and process the position data 1601 to determine the geographic position of the peripheral system. The data processing/control circuit 1602 is further configured to generate processed information 1603, including processed GPS data, system status information, and/or detachment status information. The processed information 1603 is sent from the data processing/control circuit 1602 to the wireless transceiver Tx/Rx 1608 for wireless transmission. The wireless transceiver Tx/Rx 1608 is configured to transmit system location/status information and collected data 1607 to the remote control/observation device 1605. The transmitted information may include the geographic location of the detached peripheral system, height variation data, video stream data, operating status data, and detachment status data. The remote control/observation device 1605 may be used by an operator or search team to monitor the location and condition of the detached peripheral system and to assist in retrieval of the peripheral system and associated components, including the GPR antenna. The wireless transceiver Tx/Rx 1608 is also configured to receive remote commands/control signals 1606 from the remote control/observation device 1605. The received commands, control signals, or status requests 1604 are passed from the wireless transceiver Tx/Rx 1608 to the data processing/control circuit 1602. Accordingly, the GPS module 1609, data processing/control circuit 1602, wireless transceiver Tx/Rx 1608, and remote control/observation device 1605 cooperate to provide two-way communication for transmitting location/status data and receiving remote commands following activation of the detachment mechanism.

In another embodiment, the proposed system records a topographical surface depth map of an inspected surface using the infrared sensors and depth cameras simultaneously with GPR inspection operations. During an inspection operation, the GPR antenna transmits radar signals into the inspected surface and receive reflected signals that provide information regarding subsurface features and layers. Concurrently, the infrared sensors and depth cameras capture surface elevation data corresponding to the terrain above which the GPR antenna is operating. The data processing/control circuit processes the surface elevation data from the infrared sensors and depth cameras to generate the topographical surface depth map.

The topographical surface depth map represents variations in surface elevation across an inspection area. The infrared sensors provide height measurements at locations beneath the system as the system traverses the inspection area. The depth cameras capture depth images that include distance information for multiple points within a field of view. The data processing/control circuit aggregates the height measurements from the infrared sensors and the distance information from the depth images to construct the topographical surface depth map. The topographical surface depth map is recorded in a data storage medium for subsequent analysis or is transmitted through the wireless Tx/Rx circuit to a remote station. The simultaneous recording of the topographical surface depth map and GPR inspection data enables correlation between surface features and subsurface features. The GPR antenna generates radargram data that represents underground layers and structures beneath the inspected surface. The topographical surface depth map provides a reference frame for interpreting the radargram data by indicating the elevation of the surface at each location where GPR data was collected. The correlation between surface elevation and subsurface imaging enhances interpretation of GPR inspection results.

In some cases, fusion of surface depth data obtained by the system with underground layers imaging performed by the GPR antenna enables sensor-fusion based GPR inspection applications. The surface depth data includes the topographical surface depth map generated from the infrared sensors and depth cameras. The underground layers imaging includes radargram data or processed subsurface imagery generated by the GPR antenna. The data processing/control circuit or an external processing system combines the surface depth data with the underground layers imaging to produce fused inspection data.

The sensor-fusion based GPR inspection applications provide corresponding surface depth maps of inner layers inspected by the GPR. The fused inspection data associates each subsurface feature or layer identified in the GPR imaging with a corresponding surface elevation from the topographical surface depth map. The association between surface elevation and subsurface features enables determination of absolute depths of subsurface layers relative to a reference datum. The fused inspection data also enables visualization of subsurface features in relation to surface topography. The fusion of surface depth data with underground layers imaging enhances accuracy of depth calculations for subsurface features. When the GPR antenna operates over terrain with varying surface elevation, the radargram data reflects variations in antenna height above the inspected surface. The topographical surface depth map provides correction factors that account for surface elevation variations when calculating depths of subsurface features. The corrected depth calculations improve accuracy of subsurface feature localization in sensor-fusion based GPR inspection applications.

In some cases, the sensor-fusion based GPR inspection applications enable generation of three-dimensional representations of inspected structures. The topographical surface depth map provides surface geometry information in three dimensions. The underground layers imaging from the GPR antenna provide subsurface geometry information. The fusion of surface geometry information with subsurface geometry information enables construction of three-dimensional models that represent both surface topography and subsurface features of an inspected area. The three-dimensional representations facilitate evaluation of structures such as rocky formations, archaeological sites, or damaged buildings where both surface and subsurface information contribute to assessment of structural conditions. The proposed system enables inspection of areas that are inaccessible by traditional GPR carrying mediums. Traditional GPR carrying mediums include GPR carts and inspection vehicles.

GPR carts are wheeled platforms that support a GPR antenna and are pushed or pulled along an inspected surface. Inspection vehicles are motorized platforms that carry GPR equipment along roads, pavements, or other traversable surfaces. Traditional GPR carrying mediums are limited to operating on surfaces that are relatively flat, continuous, and accessible by ground-based travel.

In another embodiment, traditional GPR carrying mediums cannot access areas due to terrain characteristics. Terrain characteristics that prevent access by traditional GPR carrying mediums include steep slopes, rocky outcrops, unstable ground, water bodies, dense vegetation, or elevated structures. Traditional GPR carrying mediums also are unable to access areas that lack continuous ground paths, such as isolated rock formations, cliff faces, or structures surrounded by hazardous conditions. The drone-mounted configuration of the system overcomes terrain-based access limitations by enabling aerial approach to inspection areas.

The system enables inspection of areas that are physically separated from accessible ground surfaces. Areas that are physically separated from accessible ground surfaces include elevated platforms, rooftops, bridge undersides, or structures located across gaps or voids. Traditional GPR carrying mediums are unable to reach such areas without construction of temporary access structures or deployment of specialized equipment. The aerial mobility provided by the drone platform allows the system to reach physically separated areas without requiring ground-based access infrastructure. In some cases, the system enables inspection of tight spaces. Tight spaces include narrow openings, confined passages, gaps between structural elements, or restricted areas that have dimensions smaller than the operational envelope of traditional GPR carrying mediums. Traditional GPR carrying mediums are unable to enter tight spaces due to the physical dimensions of the cart or vehicle platform. The system navigates into tight spaces by adjusting the orientation of the GPR antenna from a horizontal position to a tilted or vertical position, thereby reducing the effective width of the antenna assembly.

The system enables inspection of in-between-cracks. In-between-cracks include fissures, fractures, joints, or narrow separations in rock formations, concrete structures, or other materials. In-between-cracks have widths that are insufficient to accommodate traditional GPR carrying mediums. The system positions the GPR antenna within or adjacent to in-between-cracks by utilizing the altitude and tilt adjustment capabilities to orient the antenna for passage through narrow openings. The GPR antenna captures radar data from surfaces and subsurface features accessible through the in-between-cracks.

In some cases, the system enables evaluation of rocky formations with cavities. Rocky formations with cavities include natural geological structures that contain voids, caves, hollow spaces, or internal chambers. Rocky formations with cavities are located in mountainous terrain, coastal cliffs, desert landscapes, or other environments where traditional GPR carrying mediums cannot operate. The system approaches rocky formations with cavities from aerial positions and adjusts the GPR antenna altitude and tilt to inspect surfaces and subsurface features of the rocky formations. The GPR antenna detects cavities within the rocky formations by identifying radar signal reflections from void boundaries.

The proposed system enables evaluation of demolished buildings during disaster response. Demolished buildings include structures that have collapsed, partially collapsed, or sustained damage that renders the structures unsafe for ground-based access. During disaster response operations, traditional GPR carrying mediums are unable to traverse debris fields, unstable rubble, or hazardous areas surrounding demolished buildings. The system operates above demolished buildings without requiring ground contact, thereby enabling GPR inspection of debris piles and collapsed structures. The GPR antenna detects voids, buried objects, or survivors beneath rubble by capturing radar data from positions above the demolished buildings.

In an embodiment, the proposed system enables evaluation of complex archeological sites. Complex archeological sites include locations with irregular terrain, fragile surfaces, restricted access areas, or structures that cannot tolerate contact with ground-based equipment. Complex archeological sites contain artifacts, buried structures, or subsurface features that require non-invasive inspection methods. Traditional GPR carrying mediums are unsuitable for complex archeological sites due to potential damage to surface features or inability to access elevated or confined areas. The system inspects complex archeological sites by maintaining the GPR antenna at controlled altitudes above fragile surfaces and by adjusting antenna orientation to access confined spaces within the sites.

The altitude and tilt adjustment capabilities of the proposed system facilitate inspection of structures with complex geometric shapes. Structures with complex geometric shapes include surfaces that are curved, angled, stepped, or otherwise non-planar. Traditional GPR carrying mediums are designed for inspection of flat or uniformly sloped surfaces and are unable to maintain consistent antenna-to-surface distances over complex geometric shapes. The system then adjusts the GPR antenna altitude in real-time to maintain a desired proximity to surfaces with varying elevations. The system also adjusts the GPR antenna tilt to align the antenna with angled or curved surfaces, thereby improving radar signal coupling with the inspected surface.

In an embodiment, the proposed system enables inspection operations in environments where ground-based access poses safety risks. Environments where ground-based access poses safety risks include contaminated areas, structurally unstable zones, areas with active hazards, or locations with restricted human access. The drone-mounted configuration of the system allows inspection operations to be conducted from aerial positions without requiring personnel to enter hazardous environments. The remotely controlled mode of the system enables an operator to direct inspection operations from a safe distance while receiving real-time data from the GPR antenna and sensing elements.

A number of implementations have been described. Nevertheless, it will be understood that various modifications may be made without departing from the spirit and scope of the disclosure. Accordingly, other implementations are within the scope of the following claims.

The invention claimed is:

1. A drone-mounted ground penetrating radar antenna positioning system, comprising:

a drone attachment platform configured to attach to a drone;

an upper platform disposed below the drone attachment platform, the upper platform housing a data processing and control circuit, a battery, and a voltage regulator circuit connected to the battery;

a middle platform disposed between the upper platform and a lower platform, the middle platform connecting the upper platform to the lower platform;

the lower platform supporting a plurality of servo motors;

a plurality of pulleys mechanically coupled to the plurality of servo motors;

a plurality of ropes extending from the plurality of pulleys to a ground penetrating radar antenna suspended below the lower platform, wherein rotation of the plurality of servo motors causes movement of the plurality of ropes through the plurality of pulleys to adjust at least one of altitude and tilt of the ground penetrating radar antenna;

at least one infrared sensor disposed on the upper platform and oriented to face a downward direction; and at least one depth camera disposed on the upper platform and oriented to face a downward direction, wherein the data processing and control circuit receives data from the at least one infrared sensor and the at least one depth camera and jointly analyzes the short-range height measurement data and the long-range obstacle detection data to generate control signals for the plurality of servo motors to adjust the at least one of altitude and tilt of the ground penetrating radar antenna based on the received data, and wherein the data processing and control circuit is further configured to process surface elevation data from the at least one infrared sensor and the at least one depth camera to generate a topographical surface depth map of an inspected surface simultaneously with ground penetrating radar inspection operations performed by the ground penetrating radar antenna, and to correlate the topographical surface depth map with radargram data generated by the ground penetrating radar antenna.

2. The system of claim 1, wherein the plurality of servo motors provide constant position feedback to the data processing and control circuit, and wherein the data processing and control circuit uses the position feedback to determine a current altitude and tilt degree of the ground penetrating radar antenna.

3. The system of claim 2, wherein the data processing and control circuit generates control signals specifying rotation speed and rotation degree for each servo motor of the plurality of servo motors based on the position feedback and the data received from the at least one infrared sensor and the at least one depth camera.

4. The system of claim 1, further comprising a detachment mechanism disposed on the middle platform, the detachment mechanism comprising a detachment servo motor configured to release the system from the drone attachment platform when activated, wherein the detachment mechanism is configured to be activated remotely by an operator when the system becomes stuck during an inspection operation or causes instability to the drone, wherein the detachment mechanism comprises a detachment servo motor having a movable servo motor head configured to selectively move between: (i) a locked position in which the servo motor head secures the detachment mechanism to the drone attachment platform, thereby connecting the drone attachment platform to the middle platform; and (ii) a released position in which the servo motor head disengages the detachment mechanism from the drone attachment platform, thereby separating the drone attachment platform from the detachment mechanism and releasing the system, including the upper platform, the middle platform, and the lower platform, from the drone.

5. The system of claim 4, wherein the detachment servo motor comprises the movable servo motor head, wherein the movable servo motor head is configured to reside within a locking region of the drone attachment platform under normal operating conditions to maintain engagement between the drone attachment platform and the detachment mechanism, and wherein the detachment servo motor is configured to rotate the movable servo motor head approximately 180 degrees from the locking region to a release region of the drone attachment platform, thereby disengaging the detachment mechanism from the drone attachment platform and releasing the system, including the upper platform, the middle platform, and the lower platform, from the drone attachment platform.

6. The system of claim 1, further comprising a GPS module and a wireless transceiver disposed on the upper platform, wherein the GPS module is configured to generate position data corresponding to a location of the system and provide the position data to a data processing/control circuit, wherein the data processing/control circuit is configured to process the position data and generate location/status information including at least one of system location data, system operating status data, and detachment status data, and wherein the wireless transceiver is configured to transmit the location/status information to a remote control/observation device and to receive remote commands or control signals from the remote control/observation device for communication to the data processing/control circuit.

7. The system of claim 1, further comprising a wireless transmitter and receiver circuit disposed on the upper platform, the wireless transmitter and receiver circuit configured to transmit height variation data and a video stream to a remote operator and to receive adjustment commands from the remote operator.

8. The system of claim 1, wherein the at least one infrared sensor provides short-range height measurement data corresponding to distances between the system and an inspected surface, and wherein the at least one depth camera provides long-range obstacle detection data comprising depth images representing three-dimensional information about terrain below the system, wherein the at least one infrared sensor detects surface height variations and obstacles within a first distance range corresponding to short-range detection, and wherein the at least one depth camera detects obstacles and terrain features within a second distance range corresponding to long-range detection, the second distance range extending beyond the first distance range.

9. The system of claim 8, wherein the data processing and control circuit are configured to: collect short-range height measurement data from the at least one infrared sensor; collect depth image data from the at least one depth camera, the depth image data including terrain or obstacle information within a field of view of the at least one depth camera in at least one of a downward, angled, side, or forward direction relative to a movement direction of the system; generate a depth map of a surrounding terrain and obstacle region based on the depth image data; identify a long-range obstacle or terrain variation located beyond a measurement range of the at least one infrared sensor; compare the short-range height measurement data with the depth image data to determine a required altitude or tilt adjustment for the ground penetrating radar antenna; and generate an automated adjustment command to adjust at least one of an altitude or a tilt angle of the ground penetrating radar antenna.

10. The system of claim 1, wherein the data processing and control circuit is configured to operate in an automated mode in which the data processing and control circuit utilizes artificial intelligence-based analysis to adjust the altitude and tilt of the ground penetrating radar antenna in real-time based on the data received from the at least one infrared sensor and the at least one depth camera.

11. A method for adjusting a position of a ground penetrating radar antenna mounted to a drone, the method comprising:

receiving, by a data processing and control circuit, sensor data from at least one infrared sensor and at least one depth camera oriented to face a downward direction toward an inspected surface;

analyzing, by the data processing and control circuit, the sensor data to determine at least one of surface height variations and obstacles in a path of the ground penetrating radar antenna, wherein analyzing the sensor data comprises jointly analyzing short-range height measurement data from the at least one infrared sensor and long-range obstacle detection data from the at least one depth camera;

generating, by the data processing and control circuit, control signals for a plurality of servo motors based on the analyzed sensor data; and rotating, by the plurality of servo motors, a plurality of pulleys to move a plurality of ropes connected to the ground penetrating radar antenna, thereby adjusting at least one of altitude and tilt of the ground penetrating radar antenna relative to the inspected surface, generating, by the data processing and control circuit, a topographical surface depth map by processing surface elevation data obtained from the at least one infrared sensor and the at least one depth camera simultaneously with ground penetrating radar inspection operations performed by the ground penetrating radar antenna; and correlating the topographical surface depth map with radargram data generated by the ground penetrating radar antenna to produce fused inspection data that associates subsurface features identified in the radargram data with corresponding surface elevation from the topographical surface depth map.

12. The method of claim 11, further comprising receiving, by the data processing and control circuit, position feedback from the plurality of servo motors, and wherein generating the control signals is further based on the position feedback.

13. The method of claim 11, wherein adjusting the tilt of the ground penetrating radar antenna comprises:

rotating servo motors on a first side of a lower platform while maintaining servo motors on a second side of the lower platform in a stationary position, thereby pulling ropes connected to the first side of the ground penetrating radar antenna while keeping ropes connected to the second side of the ground penetrating radar antenna at a current length to shift an orientation of the ground penetrating radar antenna from a horizontal orientation toward a vertical orientation, and performing imaging by the ground penetrating radar antenna while the ground penetrating radar antenna maintains the shifted orientation, enabling inspection of areas accessible through tight spaces that are inaccessible with the ground penetrating radar antenna in a horizontal orientation.

14. The method of claim 13, further comprising:

collecting, by at least one depth camera or distance sensor, obstacle and tight-area detection data from an environment surrounding the ground penetrating radar antenna, wherein the obstacle and tight-area detection data includes data captured within at least one of a downward, angled, side, or forward field of view relative to a travel direction of the drone or the peripheral system;

generating, by the data processing and control circuit, a surrounding environment depth map based on the obstacle and tight-area detection data;

identifying, by the data processing and control circuit, a designated tight area in the surrounding environment depth map, wherein the designated tight area comprises an opening, crack, passage, clearance gap, narrow space, or obstacle-constrained region located along or near an expected travel path of the ground penetrating radar antenna;

determining, by the data processing and control circuit, dimensions of the designated tight area, including at least a tight-area length, a tight-area accessible width, and an available clearance height;

determining, by the data processing and control circuit, dimensions of the ground penetrating radar antenna, including at least an antenna length, an antenna width, and an antenna thickness or height profile;

determining, by the data processing and control circuit, a current antenna orientation including at least a current tilt angle, a current altitude, and a position of the ground penetrating radar antenna relative to the designated tight area;

determining, by the data processing and control circuit, an antenna entrance angle for passing the ground penetrating radar antenna through the designated tight area;

calculating, by the data processing and control circuit, a projected antenna clearance envelope based on the antenna length, the antenna width, the antenna thickness or height profile, the current tilt angle, and the antenna entrance angle;

comparing, by the data processing and control circuit, the projected antenna clearance envelope with the tight-area length, the tight-area accessible width, and the available clearance height to determine whether the shifted orientation of the ground penetrating radar antenna is sufficient for passing through the designated tight area without contacting detected obstacles or boundaries; and rotating, by the data processing and control circuit, all servo motors of the plurality of servo motors simultaneously to move the ground penetrating radar antenna through the designated tight area when the shifted orientation is determined to be sufficient.

15. A drone-mounted ground penetrating radar inspection system, comprising:

a peripheral system configured to attach to a drone, the peripheral system comprising:

a plurality of servo motors disposed on a lower platform;

a pulley and rope mechanism connected to the plurality of servo motors and extending to a ground penetrating radar antenna suspended below the peripheral system;

a data processing and control circuit configured to generate control signals for the plurality of servo motors;

at least one infrared sensor configured to detect surface height variations within a first distance range corresponding to short-range detection; and at least one depth camera configured to detect obstacles within a second distance range corresponding to long-range detection, the second distance range extending beyond the first distance range; and a detachment mechanism comprising a servo motor configured to release the peripheral system from the drone upon activation, the servo motor comprising a servo motor head that resides within a drone attachment platform under normal operating conditions and is configured to rotate approximately 180 degrees to cause the servo motor head to reach an empty region of the drone attachment platform, thereby releasing the peripheral system from the drone, wherein the data processing and control circuit is configured to operate in at least one of an automated mode in which the data processing and control circuit automatically adjusts altitude and tilt of the ground penetrating radar antenna based on data from the at least one infrared sensor and the at least one depth camera, and a remotely-controlled mode in which the data processing and control circuit transmits data to a remote operator and receives adjustment commands from the remote operator, wherein the data processing and control circuit is further configured to generate a topographical surface depth map of an inspected surface by processing surface elevation data from the at least one infrared sensor and the at least one depth camera simultaneously with ground penetrating radar inspection operations, and to fuse the topographical surface depth map with radargram data generated by the ground penetrating radar antenna to provide corrected depth calculations for subsurface features that account for surface elevation variations.

16. The system of claim 15, further comprising a GPS module and a wireless transceiver disposed on the peripheral system, wherein the GPS module is configured to generate position data corresponding to a location of the peripheral system following activation of the detachment mechanism, wherein a data processing/control circuit is configured to process the position data and generate location/status information including at least one of peripheral system location data, peripheral system operating status data, and detachment status data, and wherein the wireless transceiver is configured to transmit the location/status information to a remote control/observation device and to receive remote commands or control signals from the remote control/observation device for communication to the data processing/control circuit.

17. The system of claim 16, wherein the wireless transceiver is configured to receive the location/status information from the data processing/control circuit and wirelessly transmit the location/status information to a remote control/observation device, the location/status information including at least one of peripheral system location data generated based on position data from the GPS module, operating status data of the peripheral system, detachment status data, height variation data, and video stream data, and wherein the wireless transceiver is further configured to receive remote commands, control signals, or status requests from the remote control/observation device and provide the received remote commands, control signals, or status requests to the data processing/control circuit during a remotely controlled mode.

18. The system of claim 15, wherein the data processing and control circuit is configured to utilize artificial intelligence-based processing algorithms including computer vision-based distance estimation techniques to:

receive obstacle and tight-area detection data from at least one depth camera or distance sensor, wherein the obstacle and tight-area detection data includes data captured within at least one of a downward, angled, side, or forward field of view relative to a travel direction of the drone or the peripheral system;

generate a surrounding environment depth map based on the obstacle and tight-area detection data;

identify a designated tight area in the surrounding environment depth map, wherein the designated tight area comprises an opening, crack, passage, clearance gap, narrow space, or obstacle-constrained region located along or near an expected travel path of the ground penetrating radar antenna;

determine dimensions of the designated tight area, including at least a tight-area length, a tight-area accessible width, and an available clearance height;

determine dimensions of the ground penetrating radar antenna, including at least an antenna length, an antenna width, and an antenna thickness or height profile;

determine a current antenna orientation including at least a current tilt angle, a current altitude, and a position of the ground penetrating radar antenna relative to the designated tight area;

determine an antenna entrance angle for passing the ground penetrating radar antenna through the designated tight area;

calculate a projected antenna clearance envelope based on the antenna length, the antenna width, the antenna thickness or height profile, the current tilt angle, and the antenna entrance angle;

compare the projected antenna clearance envelope with the tight-area length, the tight-area accessible width, and the available clearance height to determine whether an orientation of the ground penetrating radar antenna is sufficient for passing through the designated tight area without contacting detected obstacles or boundaries; and generate control signals to rotate servo motors on a first side of the lower platform while maintaining servo motors on a second side of the lower platform in a stationary position to shift the orientation of the ground penetrating radar antenna from a horizontal orientation toward a vertical orientation when the orientation is determined to be insufficient.

* * * * *